United States Patent
Okazaki et al.

(10) Patent No.: US 7,677,223 B2
(45) Date of Patent: Mar. 16, 2010

(54) AIR-FUEL-RATIO CONTROL APPARATUS FOR INTERNAL COMBUSTION ENGINE

(75) Inventors: Shuntaro Okazaki, Susono (JP); Naoto Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 181 days.

(21) Appl. No.: 11/991,951

(22) PCT Filed: Nov. 13, 2006

(86) PCT No.: PCT/JP2006/323043

§ 371 (c)(1),
(2), (4) Date: Mar. 13, 2008

(87) PCT Pub. No.: WO2007/060900

PCT Pub. Date: May 31, 2007

(65) Prior Publication Data

US 2009/0138172 A1    May 28, 2009

(30) Foreign Application Priority Data

Nov. 24, 2005    (JP)    ............................. 2005-338113

(51) Int. Cl.
F02M 1/00    (2006.01)
B60T 7/12    (2006.01)

(52) U.S. Cl. ...................... 123/434; 123/480; 123/672; 701/103; 701/109; 60/276; 60/285; 60/303

(58) Field of Classification Search .................. 123/434, 123/435, 672, 673, 674, 703, 704, 478, 480; 701/103, 104, 109; 60/285, 286, 299, 303, 60/276, 277

See application file for complete search history.

(56) References Cited

U.S. PATENT DOCUMENTS 6,253,542 B1 *    7/2001    Omara et al. .................. 60/274
6,481,201 B2 *    11/2002    Kako et al. .................... 60/285
6,619,277 B2 *    9/2003    Katoh .......................... 123/672
6,760,657 B2 *    7/2004    Katoh .......................... 701/104
6,901,744 B2 *    6/2005    Kako et al. .................... 60/285
7,013,637 B2 *    3/2006    Yoshida ........................ 60/285
7,032,374 B2    4/2006    Okazaki et al.
2003/0066518 A1 *    4/2003    Katoh .......................... 123/672

FOREIGN PATENT DOCUMENTS

| EP | 0 719 925 A2 | 7/1996 |
| EP | 1 279 818 A2 | 1/2003 |
| JP | A 8-232728 | 9/1996 |
| JP | A 8-232731 | 9/1996 |
| JP | 2004-183585 | 7/2004 |
| JP | A 2004-257377 | 9/2004 |

* cited by examiner

*Primary Examiner*—John T Kwon
(74) *Attorney, Agent, or Firm*—Oliff & Berridge, PLC

(57) ABSTRACT

The air-fuel-ratio control apparatus for an internal combustion engine obtains a composite air-fuel ratio abyfs from a downstream-side correction value Vafsfb(k) based upon an output value Voxs from a downstream air-fuel-ratio sensor 67 and an output value Vabyfs from an upstream air-fuel-ratio sensor 66, and obtains an upstream-side feedback correction value DFi on the basis of the composite air-fuel ratio abyfs. A fuel injection quantity Fi is determined to a value obtained by adding the upstream-side correction value DFi to a control-use base fuel injection quantity Fbasec (=base fuel injection quantity Fbase·coefficient Ksub). The coefficient Ksub is determined on the basis of the downstream-side feedback correction value Vafsfb(k) in such a manner that the control-use base fuel injection quantity Fbasec (accordingly, the fuel injection quantity Fi) is determined such that the output value Vabyfs from the upstream air-fuel-ratio sensor 66 changes in the direction of canceling the change in the downstream-side feedback correction value Vafsfb(k).

9 Claims, 16 Drawing Sheets

AIR-FUEL-RATIO CONTROL APPARATUS FOR INTERNAL COMBUSTION ENGINE

TECHNICAL FIELD

The present invention relates to an air-fuel-ratio control apparatus for an internal combustion engine, which apparatus is applied to an internal combustion engine provided with air-fuel-ratio sensors disposed in an exhaust passage to be located upstream and downstream, respectively, of a catalyst unit (3-way catalyst unit) disposed in the exhaust passage, and feedback-controls the air-fuel ratio (hereinafter referred to as "air-fuel ratio") of the gas mixture supplied to the internal engine on the basis of respective outputs of the sensors.

BACKGROUND ART

For example, Japanese Patent Application Laid-Open (kokai) No. 2004-183585 discloses a conventional air-fuel-ratio control apparatus of such a type. In the disclosed air-fuel-ratio control apparatus for an internal combustion engine (hereinafter sometimes simply referred to as "engine"), a composite air-fuel ratio is obtained, which is a value on the basis of the sum of the out put value the upstream air-fuel-ratio sensor and downstream-side feedback correction value that is calculated based upon (through proportional plus integral plus derivative processing (PID processing) of) a deviation, from a predetermined downstream-side target value, of the output value of the downstream air-fuel-ratio sensor. An upstream-side feedback correction value is calculated on the basis of (through proportional plus integral processing (PI processing) of a deviation) the value corresponding to the deviation of the composite air-fuel ratio from the target air-fuel ratio (the deviation of the cylinder fuel supply quantity, which is obtained by dividing a cylinder intake air quantity by the composite air-fuel ratio, from the target cylinder fuel supply quantity, which is obtained by dividing the cylinder intake air quantity by the target air-fuel ratio). A fuel injection quantity is calculated on the basis of the upstream-side feedback correction value and a base fuel injection quantity, which is a quantity of fuel acquired based upon the operation state of the engine for obtaining the target air-fuel ratio. The instruction for injecting the fuel in the fuel injection quantity is given to an injector, whereby the air-fuel ratio is feedback-controlled.

Meanwhile, a fluctuation may be produced in the downstream-side feedback correction value due to the influence of disturbance or the like. In this case, as shown in FIG. 17, the fluctuation produced in the downstream-side feedback correction value is transmitted as the fluctuation of the composite air-fuel ratio obtained on the basis of the downstream-side feedback correction value, and the fluctuation of the composite air-fuel ratio is transmitted to the upstream-side feedback correction value.

When the fluctuation is transmitted to the upstream-side feedback correction value, the fluctuation is also transmitted to the fuel injection quantity calculated based upon the upstream-side feedback correction value. When the fluctuation is transmitted to the fuel injection quantity, the fluctuation is also transmitted to the air-fuel ratio (i.e., air-fuel ratio of exhaust gas) that is based upon the fuel injection quantity. Accordingly, the fluctuation is transmitted to the output value from the upstream-side sensor and the output value from the downstream-side sensor. As a result, the fluctuation is transmitted to the downstream-side feedback correction value that is based upon the output value from the downstream air-fuel-ratio sensor. A series of flow of transmitting the fluctuation in this manner is referred to as "transmission loop of fluctuation".

Since the composite air-fuel ratio is the value based upon the sum of the output value from the upstream air-fuel-ratio sensor and the downstream-side feedback correction value as described above, the fluctuation of the composite air-fuel ratio can be increased more than the fluctuation of the output value from the upstream air-fuel-ratio sensor. Therefore, when the "transmission loop of fluctuation" is repeated, the fluctuation produced in the upstream-side feedback correction value that is calculated on the basis of the composite air-fuel ratio gradually increases, resulting in entailing a problem of the increase in the fluctuation of the air-fuel ratio.

DISCLOSURE OF INVENTION

An object of the present invention is to provide an air-fuel-ratio control apparatus for an internal combustion engine, which apparatus feedback-controls the air-fuel ratio by calculating the fuel injection quantity on the basis of the upstream-side feedback correction value that is based upon the composite air-fuel ratio, and which apparatus can suppress the increase in the fluctuation of the air-fuel ratio that is caused by the repeat of the "transmission loop of fluctuation".

An air-fuel-ratio control apparatus according to the present invention is applied to an internal combustion engine including a catalyst unit, upstream air-fuel-ratio sensor, downstream air-fuel-ratio sensor, and fuel injecting means (e.g., injector) for injecting fuel according to an instruction.

The present invention provides an air-fuel-ratio control apparatus including: base fuel injection quantity acquiring means that acquires the base fuel injection quantity; downstream-side feedback correction value calculation means that calculates the downstream-side feedback correction value; control-use base fuel injection quantity acquiring means that acquires a control-use base fuel injection quantity, which is a base fuel injection quantity for feedback-controlling the air-fuel ratio on the basis of the acquired base fuel injection quantity and the calculated downstream-side feedback correction value; composite air-fuel ratio acquiring means that acquires a value corresponding to composite air-fuel ratio on the basis of the output value from the upstream air-fuel-ratio sensor and the calculated downstream-side feedback correction value; upstream-side feedback correction value calculation means that calculates the upstream-side feedback correction value on the basis of the acquired value corresponding to composite air-fuel ratio; fuel injection quantity calculation means that calculates the fuel injection quantity on the basis of the acquired control-use base fuel injection quantity and the calculated upstream-side feedback correction value; and air-fuel-ratio control means that feedback-controls the air-fuel ratio by giving the instruction for injecting the fuel in the calculated fuel injection quantity to the fuel injecting means.

Here, the value corresponding to the composite air-fuel ratio is the sum of the output value from the upstream air-fuel-ratio sensor and the downstream-side feedback correction value; the composite air-fuel ratio that is the air-fuel ratio corresponding to the sum of the output value from the upstream air-fuel-ratio sensor and the downstream-side feedback correction value; or the cylinder fuel supply quantity that is the value obtained by dividing the cylinder intake air quantity by the composite air-fuel ratio, but it is not limited thereto.

By virtue of this configuration, the fuel injection quantity is calculated based upon the control-use base fuel injection quantity, whereby the output value from the upstream airfuel-ratio sensor can positively be adjusted by using the control-use base fuel injection quantity. Further, the control-use base fuel injection quantity is obtained on the basis of the downstream-side feedback correction value. Therefore, the control-use base fuel injection quantity can be determined in such a manner that the output value from the upstream air-fuel-ratio sensor changes in the direction of canceling the change in the downstream-side feedback correction value.

Accordingly, even if the downstream-side feedback correction value changes, the change in the composite air-fuel ratio can be suppressed. Therefore, even if the above-described "transmission loop of fluctuation" is repeated, it is prevented that the fluctuation of the upstream-side feedback correction value according to the composite air-fuel ratio gradually increases, whereby the increase in the fluctuation of the air-fuel ratio can be suppressed.

It is preferable that the control-use base fuel injection quantity acquiring means is configured to acquire the control-use base fuel injection quantity by multiplying the acquired base fuel injection quantity by the value, which is obtained by adding 1 to the value through the multiplication of the calculated downstream-side feedback correction value by a prescribed coefficient.

In general, the downstream-side feedback correction value varies on the basis of "0". When the control-use base fuel injection quantity is acquired by multiplying the base fuel injection quantity by the value that changes according to the downstream-side feedback correction value, the basis of the variation of the value needs to be changed from "0" to "1". Therefore, in this case, the above-mentioned configuration makes it possible, with a simple calculation, to determine the control-use base fuel injection quantity in such a manner that the output value from the upstream air-fuel-ratio sensor changes in the direction of canceling the change in the downstream-side feedback correction value.

It is preferable that the composite air-fuel ratio acquiring means is configured to use the value that is obtained by providing a delay process to the downstream-side feedback correction value (as well as use the output value itself from the upstream air-fuel-ratio sensor) upon acquiring the value corresponding to the composite air-fuel ratio.

In general, the injection of fuel (instruction of injection) is executed during an intake stroke (or before the intake stroke), and the injected fuel is ignited (combusted) in a combustion chamber at the point in the vicinity of the compression top dead center, which point has come afterward. As a result, the generated exhaust gas is exhausted to the exhaust passage from the combustion chamber through the exhaust valve, and then, reaches the (detection section of) the upstream air-fuel-ratio sensor by the movement of the exhaust gas in the exhaust passage. Further, it takes a predetermined time for the change in the air-fuel ratio of the exhaust gas reaching the detection section of the upstream air-fuel-ratio sensor to appear as the change in the output value from the same sensor.

From the above, a delay time caused by the delay (stroke delay) relating to the combustion stroke, delay (transportation delay) relating to the movement of exhaust gas in the exhaust passage, and delay (response delay) relating to the response of the upstream air-fuel-ratio sensor is required during the period from the instruction for injecting fuel to the time that the air-fuel ratio of the exhaust gas according to the combustion of the fuel injected in accordance with the instruction for the injection appears as the output value from the upstream air-fuel-ratio sensor.

Therefore, when the downstream-side feedback correction value changes, the change in the air-fuel ratio of the exhaust gas produced in accordance with the instruction of injecting the fuel in the fuel injection quantity based upon the control-use base fuel injection quantity appears as the change in the output value from the upstream air-fuel-ratio sensor with the delay time caused by the stroke delay, transportation delay, and response delay, even if the control-use base fuel injection quantity is changed in such a manner that the output value from the upstream air-fuel-ratio sensor changes in the direction of canceling the change in the downstream-side feedback correction value.

In other words, when the downstream-side feedback correction value changes, the change in the output value from the upstream air-fuel-ratio sensor for canceling the change in the downstream-side feedback correction value appears with the delay time caused by the stroke delay, transportation delay, and response delay. Therefore, when the downstream-side feedback correction itself is used for obtaining the composite air-fuel ratio, the change in the downstream-side feedback correction value cannot effectively be canceled, with the result that the change in the composite air-fuel ratio (accordingly, change in the upstream-side feedback correction value) cannot effectively be prevented.

On the other hand, when the value obtained by providing the delay process to the downstream-side feedback correction value is used upon obtaining the composite air-fuel ratio, the change in the downstream-side feedback correction value used for obtaining the composite air-fuel ratio can be delayed in accordance with the delay of the change in the output value from the upstream air-fuel-ratio sensor for canceling the change in the downstream-side feedback correction value. Consequently, the change in the downstream-side feedback correction value can effectively be canceled, whereby the change in the composite air-fuel ratio (accordingly, the change in the upstream-side feedback correction value) can effectively be suppressed.

Further, the air-fuel-ratio control apparatus according to the present invention includes dead time acquiring means that acquires a dead time, which is the period from the instruction for injecting the fuel to the time that the exhaust gas according to the combustion of the fuel reaches the upstream air-fuel-ratio sensor, and the composite air-fuel ratio acquiring means is preferably configured to use the downstream-side feedback correction value calculated at the point the dead time before the present point in time as the value obtained by providing the delay process to the downstream-side feedback correction value.

Here, the dead time corresponds to the sum of the time relating to the stroke delay and the time relating to the transportation delay. The aforesaid configuration makes it possible to agree the timing of the change in the output value from the upstream air-fuel-ratio sensor with the timing of the change in the downstream-side feedback correction value. As a result, the change in the downstream-side feedback correction value can effectively be canceled.

Here, the dead time acquiring means is preferably configured to change the dead time in accordance with the operation state of the internal combustion engine. The dead time changes in accordance with the operation state of the engine such as the operation speed, cylinder intake air quantity, and the like. Therefore, according to the aforesaid configuration, the dead time can correctly be acquired regardless of the operation state of the engine.

The air-fuel-ratio control apparatus according to the present invention further includes low-pass filter processing means that provides a low-pass filter process to the downstream-side feedback correction value, and the composite air-fuel ratio acquiring means is preferably configured to use the value obtained by providing the low-pass filter process to the downstream-side feedback correction value as the value obtained by providing the delay process to the downstream-side feedback correction value.

This configuration makes it possible to agree the degree of the delay of the change in the downstream-side feedback correction value by the low-pass filter process with the degree of the response delay of the change in the output value from the upstream air-fuel-ratio sensor, whereby even if the downstream-side feedback correction value sharply changes (e.g., it changes in a stepwise manner), the change in the downstream-side feedback correction value can effectively be canceled.

The low-pass filter processing means is preferably configured to change a parameter relating to the responsiveness of the low-pass filter process in accordance with the operation state of the internal combustion engine. By virtue of this configuration, the parameter (e.g., time constant of the low-pass filter process) relating to the responsiveness of the low-pass filter process is changed in accordance with, for example, the operation state of the engine such as the operation speed, cylinder intake air quantity, etc. As a result, regardless of the operation state of the engine, the degree of the delay of the change in the downstream-side feedback correction value to which the low-pass filter process is provided can be matched to the degree of the response delay of the change in the output value from the upstream air-fuel-ratio sensor.

Meanwhile, in general, there inevitably arises a difference between the air flow rate, in the intake passage, which flow rate is measured by an air flow meter and used for obtaining the base fuel injection quantity and the actual air flow rate, and a difference between the fuel injection quantity of the fuel instructed to be injected to the injector that injects the fuel and the actual fuel injection quantity (these differences are hereinafter referred to as "error of base fuel injection quantity"). In order to converge the air-fuel ratio to the target air-fuel ratio while compensating the error of the base fuel injection quantity, a processing (i.e., integral processing (I processing)), for example, for calculating the upstream-side feedback correction value on the basis of the time-integrated value, which is the difference between the value corresponding to the target air-fuel ratio and the value corresponding to the composite air-fuel ratio, may be executed during the upstream-side feedback control.

Therefore, based upon this knowledge, the upstream-side feedback correction value calculation means is preferably configured to calculate the upstream-side feedback correction value on the basis of the value obtained by providing at least the integral processing to the difference between the value corresponding to the target air-fuel ratio and the obtained value corresponding to the composite air-fuel ratio.

By virtue of this configuration, the time-integrated value of the difference between the value corresponding to the target air-fuel ratio and the value corresponding to the composite air-fuel ratio is repeatedly updated by the integral processing, whereby the upstream-side feedback correction value is determined. As a result, the air-fuel ratio can be converged to the target air-fuel ratio while compensating the error of the base fuel injection quantity.

The "difference between the value corresponding to the target air-fuel ratio and the obtained value corresponding to the composite air-fuel ratio" is, for example, the difference between the output value from the upstream air-fuel-ratio sensor corresponding to the target air-fuel ratio and the sum of the output value from the upstream air-fuel-ratio sensor and the downstream-side feedback correction value, the difference between the target air-fuel ratio and the composite air-fuel ratio, and the difference between the target cylinder fuel supply quantity obtained by dividing the cylinder intake air quantity by the target air-fuel ratio and the cylinder fuel supply quantity obtained by dividing the cylinder intake air quantity by the composite air-fuel ratio, but it is not limited thereto.

The air-fuel-ratio control apparatus according to the present invention preferably further includes base fuel injection quantity correcting means that corrects the base fuel injection quantity in such a manner that the quantity of the fuel actually injected by the fuel injecting means becomes the quantity necessary for making the actual air-fuel ratio of the gas mixture supplied to the internal combustion engine equal to the target air-fuel ratio, when it is assumed that the instruction for injecting the fuel in the base fuel injection quantity is given.

When the error of the base fuel injection quantity rapidly increases, the integral processing in which the upstream-side feedback correction value for compensating the error of the base fuel injection quantity is determined by the repeated update of the time-integrated value cannot immediately compensate the error of the base fuel injection quantity, and hence, the exhaust quantity of emission might temporarily increase.

On the other hand, according to the above-mentioned configuration, the base fuel injection quantity is immediately determined, by the base fuel injection quantity correcting means, to a value for appropriately compensating the error of the base fuel injection quantity, whereby the error of the base fuel injection quantity can immediately be compensated without performing the integral processing during the upstream-side feedback control. As a result, the temporal increase in the exhaust quantity of emission due to the increase in the error of the base fuel injection quantity can be prevented.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

BEST MODE FOR CARRYING OUT THE INVENTION

Embodiments of an air-fuel-ratio control apparatus for an internal combustion engine according to the present invention will be described with reference to the drawings.

First Embodiment

Figure 1:
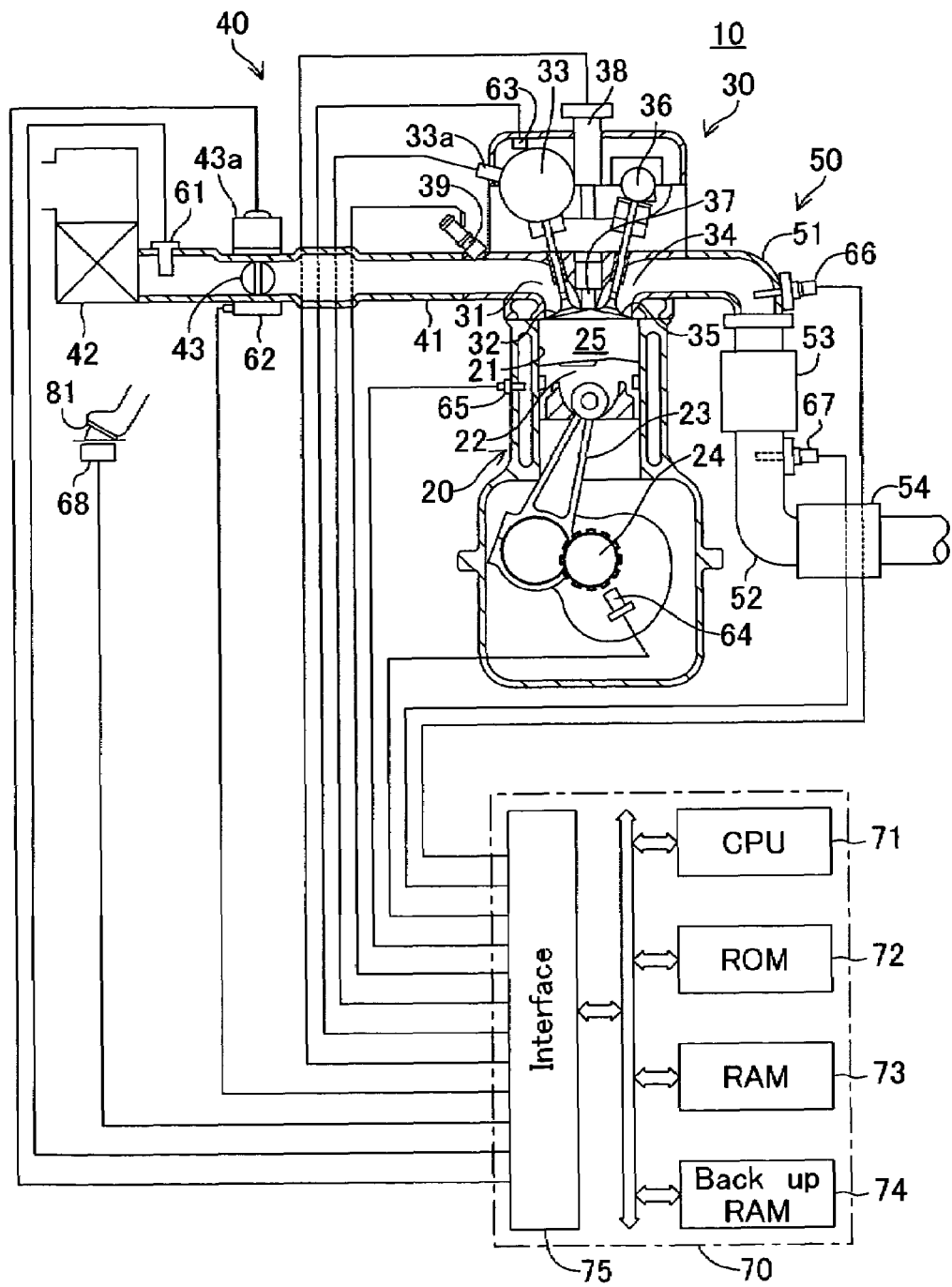
FIG. 1 is a schematic view of an internal combustion engine to which an air-fuel-ratio control apparatus according to a first embodiment of the present invention is applied.

FIG. 1 shows a schematic configuration of a system configured such that an air-fuel-ratio control apparatus according to a first embodiment of the present invention is applied to a spark-ignition multi-cylinder (e.g., 4-cylinder) internal combustion engine 10. The internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline-air mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes, for each cylinder or all the cylinders, an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33a of the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 including an intake manifold, communicating with the intake port 31, and forming an intake passage together with the intake port 31; an air filter 42 provided at an end portion of the intake pipe 41; a throttle valve 43 provided within the intake pipe 41 and adapted to vary the cross-sectional opening area of the intake passage; and a throttle valve actuator 43a, which consists of a DC motor and serves as throttle valve drive means.

The exhaust system 50 includes an exhaust manifold 51 communicating with the corresponding exhaust port 34; an exhaust pipe 52 connected to the exhaust manifold 51 (in actuality, connected to a merge portion where a plurality of the exhaust manifolds 51 communicating with the corresponding exhaust ports 34 merge together); an upstream 3-way catalyst unit 53 (also called upstream catalytic converter or start catalytic converter; however, hereinafter referred to as the "first catalyst unit 53") disposed (interposed) in the exhaust pipe 52; and a downstream 3-way catalyst unit 54 (also called under-floor catalytic converter because it is disposed under the floor of the vehicle; however, hereinafter referred to as the "second catalyst unit 54") disposed (interposed) in the exhaust pipe 52 to be located downstream of the first catalyst unit 53. The exhaust port 34, the exhaust manifold 51, and the exhaust pipe 52 form an exhaust passage.

Meanwhile, this system includes a hot-wire air flowmeter 61; a throttle position sensor 62; a cam position sensor 63; a crank position sensor 64; a water temperature sensor 65; an air-fuel-ratio sensor 66 (hereinafter referred to as the "upstream air-fuel-ratio sensor 66") disposed in the exhaust passage to be located upstream of the first catalyst unit 53 (in the present embodiment, located at the merge portion where the exhaust manifolds 51 merge together); an air-fuel-ratio sensor 67 (hereinafter referred to as the "downstream air-fuel-ratio sensor 67") disposed in the exhaust passage to be located between the first catalyst unit 53 and the second catalyst unit 54; and an accelerator opening sensor 68.

The hot-wire air flowmeter 61 detects the mass flow rate per unit time of intake air flowing through the intake pipe 41, and outputs a signal indicative of the mass flow rate Ga. The throttle position sensor 62 detects the opening of the throttle valve 43 and outputs a signal indicative of the throttle-valve opening TA. The cam position sensor 63 generates a signal that assumes the form of a single pulse (G2 signal) every time the intake cam shaft rotates by 90° (i.e., every time the crankshaft 24 rotates by 180°). The crank position sensor 64 outputs a signal that assumes the form of a narrow pulse every 10° rotation of the crankshaft 24 and assumes the form of a wide pulse every 360° rotation of the crankshaft 24. This signal indicates the operation speed NE. The water temperature sensor 65 detects the temperature of cooling water for the internal combustion engine 10 and outputs a signal indicative of the cooling-water temperature THW.

Figure 2:
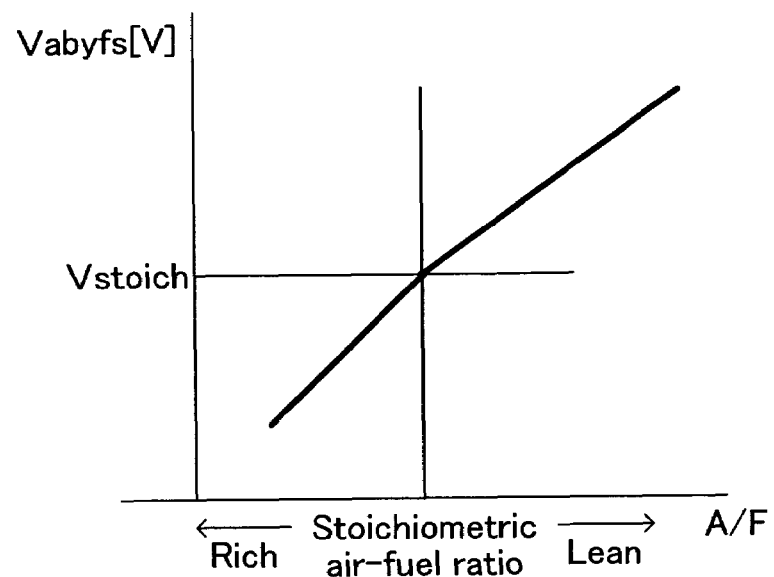
FIG. 2 is a graph showing the relationship between output voltage of an upstream air-fuel-ratio sensor shown in FIG. 1 and air-fuel ratio.

The upstream air-fuel-ratio sensor 66 is a limiting-current-type oxygen concentration sensor. As shown in FIG. 2, the upstream air-fuel-ratio sensor 66 outputs a current corresponding to the measured air-fuel ratio A/F, and outputs a voltage value vabyfs, which is a voltage corresponding to the current. When the air-fuel ratio is equal to the stoichiometric air-fuel ratio, the voltage value vabyfs becomes an upstream-side target value Vstoich. As is apparent from FIG. 2, the upstream air-fuel-ratio sensor 66 can accurately detect the air-fuel ratio A/F over a wide range.

Figure 3:
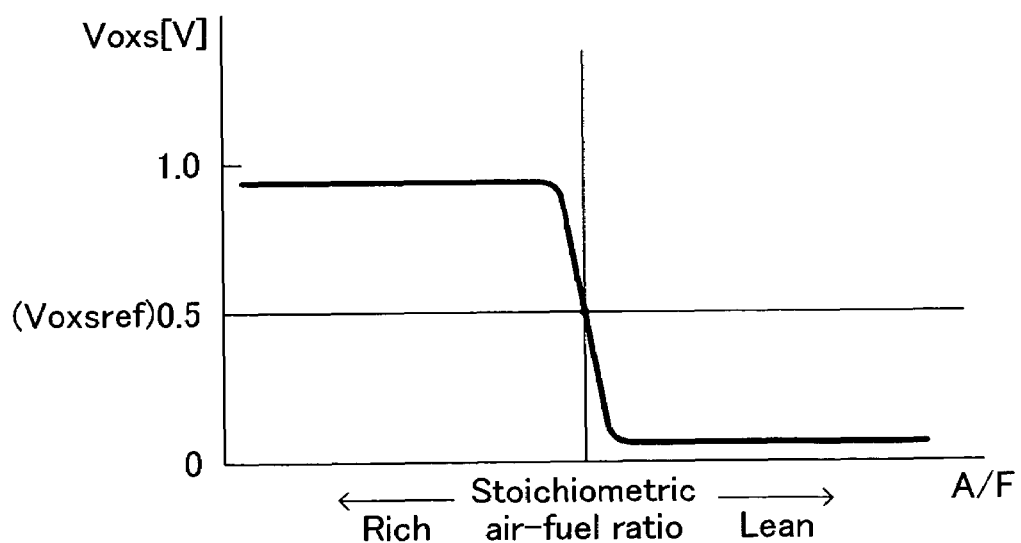
FIG. 3 is a graph showing the relationship between output voltage of a downstream air-fuel-ratio sensor shown in FIG. 1 and air-fuel ratio.

The downstream air-fuel-ratio sensor 67 is an electromotive-force-type (concentration-cell-type) oxygen concentration sensor. As shown in FIG. 3, the downstream air-fuel-ratio sensor 67 outputs an output value Voxs, which is a voltage that changes sharply in the vicinity of the stoichiometric air-fuel ratio. More specifically, the downstream air-fuel-ratio sensor 67 outputs about 0.1 V when the measured air-fuel ratio is on the lean side with respect to the stoichiometric air-fuel ratio, about 0.9 V when the measured air-fuel ratio is on the rich side with respect to the stoichiometric air-fuel ratio, and 0.5 V when the measured air-fuel ratio is equal to the stoichiometric air-fuel ratio. The accelerator opening sensor 68 detects an operation amount of an accelerator pedal 81 operated by a driver, and outputs a signal representing the operation amount Accp of the accelerator pedal 81.

An electric control device 70 is a microcomputer, and includes the following components, which are mutually connected via a bus: a CPU 71; ROM 72 in which routines (programs) to be executed by the CPU 71, tables (lookup tables, maps), constants, and the like are stored in advance; RAM 73 in which the CPU 71 stores data temporarily as needed; backup RAM 74, which stores data while power is on and retains the stored data even while power is held off; and an interface 75 including AD converters. The interface 75 is connected to the sensors 61 to 68. Signals from the sensors 61 to 68 are supplied to the CPU 71 through the interface 75. Drive signals from the CPU 71 are sent, through the interface 75, to the actuator 33a of the variable intake timing unit 33, the igniter 38, the injector 39, and the throttle valve actuator 43a.

Outline of Air-Fuel Ratio Feedback Control:

Next will be described the outline of feedback control of the air-fuel ratio of the engine, which is performed by the air-fuel-ratio control apparatus configured as described above.

The air-fuel-ratio control apparatus of the present embodiment controls the air-fuel ratio in accordance with the output value of Vabyfs of the upstream air-fuel-ratio sensor 66 (i.e., the air-fuel-ratio as measured upstream of the first catalyst unit 53) and the output value Voxs of the downstream air-fuel-ratio sensor 67 (i.e., the air-fuel ratio as measured downstream of the first catalyst unit 53) in such a manner that the output value of the downstream air-fuel-ratio sensor 67 becomes equal to a downstream-side target value Voxsref (0.5 V) corresponding to the stoichiometric air-fuel ratio.

Figure 4:
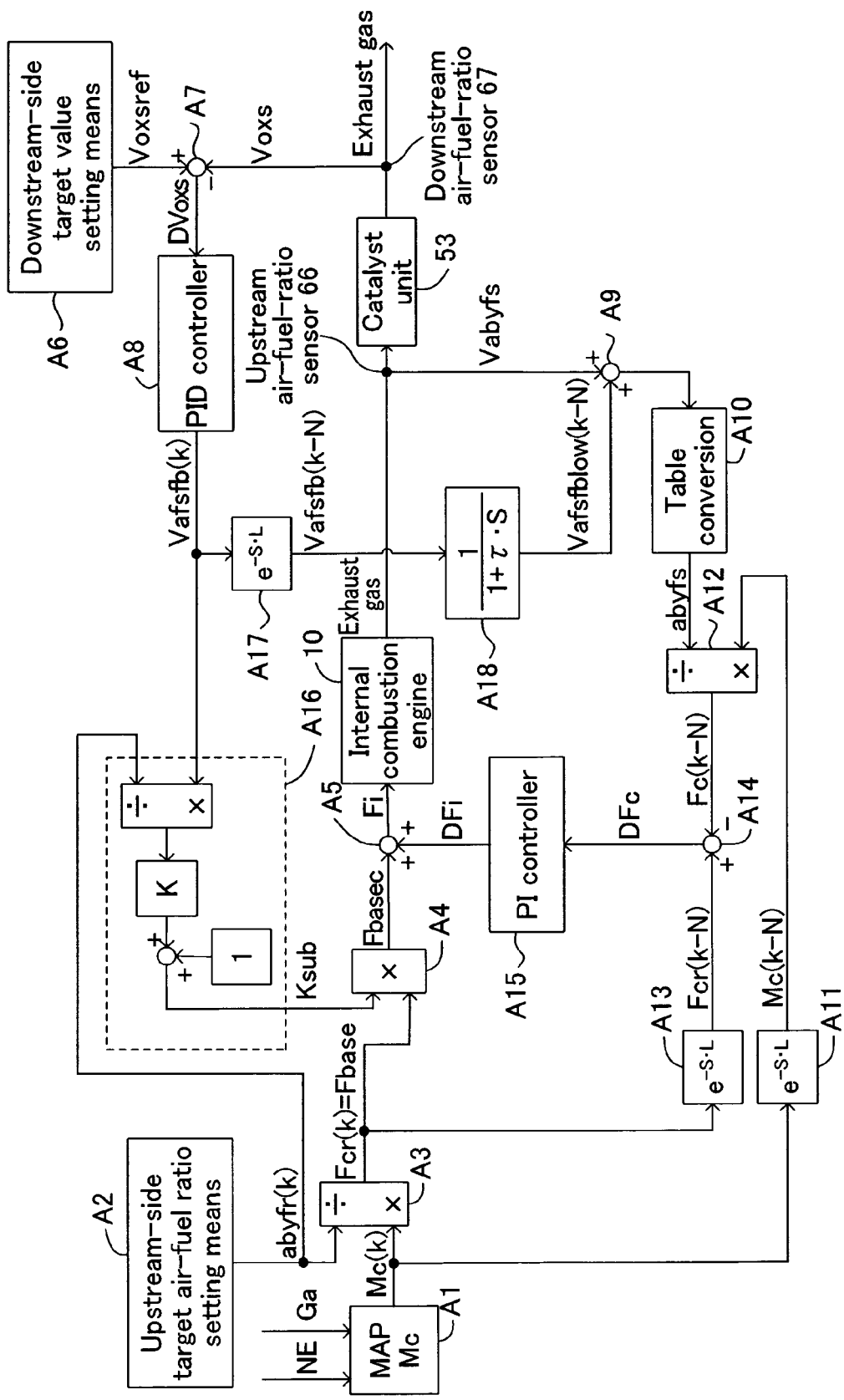
FIG. 4 is a functional block diagram when the air-fuel-ratio control apparatus shown in FIG. 1 executes an air-fuel-ratio feedback control.

More specifically, as shown by the functional block diagram of FIG. 4, the air-fuel-ratio control apparatus (hereinafter, may be referred to as the "present apparatus") includes various means A1 to A18. Each of the means A1 to A18 will be described with reference to FIG. 4.

<Calculation of Control-use Base Fuel Injection Quantity>

First, cylinder intake air quantity calculation means A1 calculates a cylinder intake air quantity Mc(k), which is the quantity of air taken in a cylinder which is starting an intake stroke this time, on the basis of the intake-air flow rate Ga measured by the air flowmeter 61, the operation speed NE obtained on the basis of the output of the crank position sensor 64, and a table MapMc stored in the ROM 72. Notably, the subscript (k) represents that the cylinder intake air quantity is a value regarding the present intake stroke (the same also applies to other physical quantities). The cylinder intake air quantity Mc is stored in the RAM 73 whenever each cylinder starts the intake stroke, in such a manner that the cylinder intake air quantity is related to each intake stroke of each cylinder.

Upstream-side target air-fuel ratio setting means A2 determines an upstream-side target air-fuel ratio abyfr(k) on the basis of operating conditions of the internal combustion engine 10, such as operation speed NE and throttle-valve opening TA. Except for special cases, the upstream-side target air-fuel ratio abyfr(k) is set to the stoichiometric air-fuel ratio after completion of warming up of the internal combustion engine 10. The upstream-side target air-fuel ratio abyfr is stored in the RAM 73 whenever each cylinder starts the intake stroke, in such a manner that the cylinder intake air quantity is related to each intake stroke of each cylinder.

Base fuel injection quantity calculation means A3 calculates a target cylinder fuel supply quantity Fcr(k) (i.e., base fuel injection quantity Fbase), which is a fuel injection quantity for the present intake stroke required to render the air-fuel ratio of the engine equal to the upstream-side target air-fuel ratio abyfr(k), by dividing the cylinder intake air quantity Mc(k), obtained by the cylinder intake air quantity calculation means A1, by the upstream-side target air-fuel ratio abyfr(k) set by the upstream-side target air-fuel ratio setting means A2. The target cylinder fuel supply quantity Fcr is stored in the RAM 73 whenever each cylinder starts the intake stroke, in such a manner that the cylinder intake air quantity is related to each intake stroke of each cylinder. The base fuel injection quantity calculation means A3 corresponds to base fuel injection quantity acquiring means.

Control-use base fuel injection quantity calculation means A4 calculates a control-use base fuel injection quantity Fbasec on the basis of the following Equation (1) by multiplying the base fuel injection quantity Fbase, obtained by the base fuel injection quantity calculation means A3, by a control-use base fuel injection quantity calculation coefficient Ksub obtained by coefficient calculation means A16. The coefficient calculation means A16 will be described later. The control-use base fuel injection quantity calculation means A4 corresponds to control-use base fuel injection quantity acquiring means.

$$Fbasec = Ksub \cdot Fbase \qquad \text{Eq. (1)}$$

In the above-described manner, the present apparatus obtains the control-use base fuel injection quantity Fbasec by utilizing the cylinder intake air quantity calculation means A1, upstream-side target air-fuel ratio setting means A2, base fuel injection quantity calculation means A3, control-use base fuel injection quantity calculation means A4, and coefficient calculation means A16.

<Calculation of Fuel Injection Quantity>

Fuel injection quantity calculation means A5 calculates a fuel injection quantity Fi in accordance with Equation (2) described below by adding an upstream-side feedback correction value DFi described later to the control-use base fuel injection quantity Fbasec obtained by the control-use base fuel injection quantity calculation means A4. The fuel injection quantity calculation means A5 corresponds to fuel injection quantity calculation means.

$$Fi = Fbasec + DFi \qquad \text{Eq. (2)}$$

In this manner, the present apparatus causes the injector 39 to inject fuel to a cylinder which starts the present intake stroke, in the fuel injection quantity Fi, which is obtained through correction of the control-use base fuel injection quantity Fbasec, the correction being performed by the fuel injection quantity calculation means A5 on the basis of the upstream-side feedback correction value DFi. The means for giving an instruction of the fuel injection corresponds to air-fuel-ratio control means.

<Calculation of Downstream-side Feedback Correction Value>

First, as in the case of the above-described upstream-side target air-fuel ratio setting means A2, downstream-side target value setting means A6 determines a downstream-side target value Voxsref on the basis of operating conditions of the internal combustion engine 10, such as operation speed NE and throttle-valve opening TA. Except for special cases, the downstream-side target value Voxsref is set to 0.5 (V), which is a value corresponding to the stoichiometric air-fuel ratio after completion of warming up of the internal combustion engine 10 (see FIG. 3). Further, in the present embodiment, the downstream-side target value Voxsref is set in such a manner that the air-fuel ratio corresponding to the downstream-side target value Voxsref is always equal to the above-described upstream-side target air-fuel ratio abyfr(k).

Output deviation calculation means A7 obtains an output deviation DVoxs in accordance with Equation (3) described below; i.e., by subtracting the output value Voxs of the downstream air-fuel-ratio sensor 67 at this moment from the downstream-side target value Voxsref presently set (specifically, set at the point when the instruction of injection of Fi this time is started) by the downstream-side target value setting means A6.

$$DVoxs = Voxsref - Voxs \qquad \text{Eq. (3)}$$

A PID controller A8 obtains a downstream-side feedback correction value Vafsfb(k) in accordance with Equation (4) described below; i.e., by performing proportional plus integral plus derivative processing (PID processing) for the output deviation DVoxs. The downstream-side feedback correction value Vafsfb is stored in the RAM 73 whenever each cylinder starts the intake stroke, in such a manner that the cylinder intake air quantity is related to each intake stroke of each cylinder.

$$Vafsfb(k) = Kp \cdot DVoxs + Ki \cdot SDVoxs + Kd \cdot DDVoxs \qquad \text{Eq. (4)}$$

In Equation (4), Kp is a preset proportional gain (proportional constant), Ki is a preset integral gain (integral constant), and Kd is a preset derivative gain (derivative constant). Further, SDVoxs is a value obtained through integration of the output deviation DVoxs with respect to time, and DDVoxs is a value obtained through differentiation of the output deviation DVoxs with respect to time. Since the PID controller A8 contains the integral term Ki·SDVoxs, under a steady state, the output deviation DVoxs is assured of becoming zero. In other words, the steady-state deviation of the output value Voxs of the downstream air-fuel-ratio sensor 67 from the downstream-side target value Voxsref becomes zero.

In the above-described manner, the present apparatus obtains the downstream-side feedback correction value Vafsfb(k), on the basis of the output value Voxs, in such a manner that the steady-state deviation of the output value Voxs of the downstream air-fuel-ratio sensor 67 from the downstream-side target value Voxsref becomes zero. This downstream-side feedback correction value Vafsfb(k) is used for calculating a control-use base fuel injection quantity calculation coefficient Ksub, and acquiring a composite air-fuel ratio abyfs, as described later. The downstream-side target value setting means A6, output deviation calculation means A7, and PID controller A8 correspond to downstream-side feedback correction value calculation means.

<Acquisition of Composite Air-fuel Ratio>

Output value corresponding to composite air-fuel ratio calculation means A9 obtains an output value corresponding to composite air-fuel ratio (Vabyfs+Vafsfblow(k−N)) by adding a low-pass-filter passed downstream-side feedback correction value Vafsfblow(k−N) to the output value Vabyfs from the upstream air-fuel-ratio sensor 66 at the present time. The low-pass-filter passed downstream-side feedback correction value Vafsfblow(k−N) is a value obtained by providing a delay process to the downstream-side feedback correction value Vafsfb(k) with the use of downstream-side feedback correction value delay means A17 and low-pass filter A18 described later.

Table conversion means A10 obtains the composite air-fuel ratio abyfs at the present time on the basis of the output value corresponding to composite air-fuel ratio (Vabyfs+Vafsfblow(k−N)) calculated by the output value corresponding to composite air-fuel ratio calculation means A9 and with reference to the table Mapabyfs shown in the previously-described FIG. 2, which defines the relationship between air-fuel ratio A/F and output value Vabyfs of the upstream air-fuel-ratio sensor 66.

As described above, the present apparatus obtains the composite air-fuel ratio abyfs by utilizing the downstream-side feedback correction value delay means A17, low-pass filter A18, output value corresponding to composite air-fuel ratio calculation means A9, and table conversion means A10. The downstream-side feedback correction value delay means A17, low-pass filter A18, output value corresponding to composite air-fuel ratio calculation means A9, and table conversion means A10 correspond to composite air-fuel ratio acquiring means.

<Calculation of Upstream-side Feedback Correction Value>

As described above, the RAM 73 stores cylinder intake air quantities Mc which the cylinder intake air quantity calculation means A1 has obtained for each of intake strokes. Cylinder intake-air quantity delay means A11 reads from the RAM 73 a cylinder intake air quantity Mc of the cylinder which has started an intake stroke at N strokes before the present point in time, and stores the same as a cylinder intake air quantity Mc(k−N). The stroke N corresponds to the sum of the time taken for the stroke delay and the time taken for the transportation delay (hereinafter referred to as "dead time L").

Figure 5:
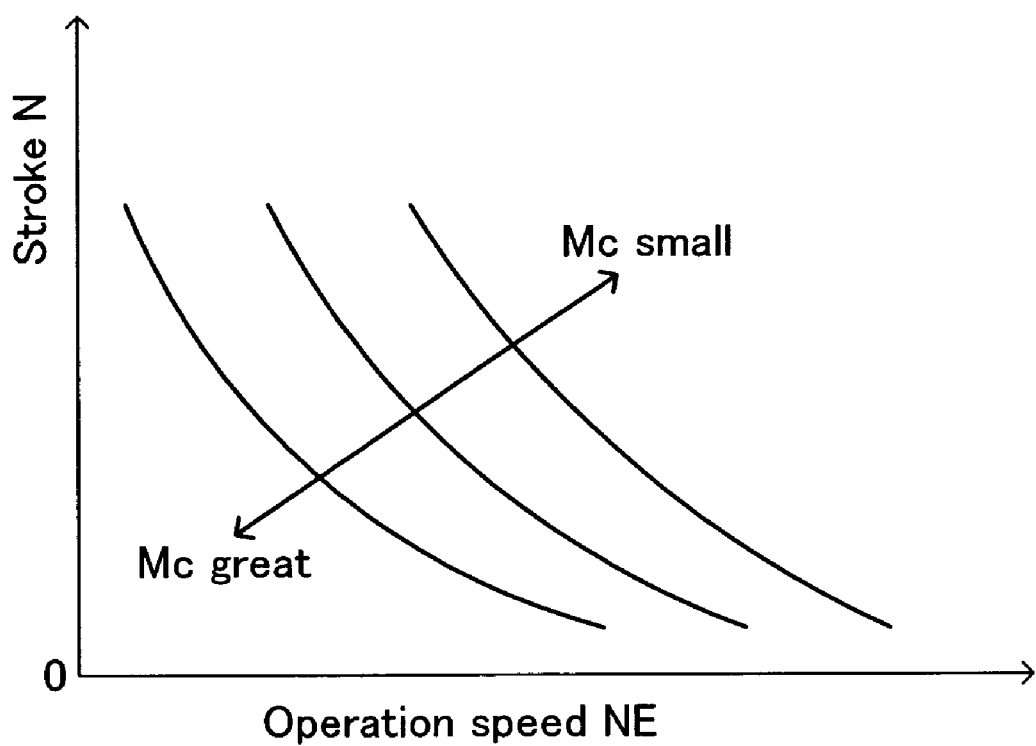
FIG. 5 is a graph referred to by the CPU shown in FIG. 1 and showing a table that defines the relationship between a cylinder intake-air quantity as well as an operation speed and a stroke corresponding to the dead time.

In this dead time L, the time taken for the stroke delay is shortened with the increase in the operation speed NE, and the time taken for the transportation delay is shortened with the increase in the operation speed NE and the increase in the cylinder intake-air quantity Mc(k). Specifically, the dead time L is shortened with the increase in the operation speed NE and the increase in the cylinder intake-air quantity Mc(k). Therefore, the dead time L (accordingly, stroke N) can be obtained based upon the cylinder intake air quantity Mc(k), operation speed NE, and a table MapN(Mc(k), NE) shown in the graph of FIG. 5, which defines the relationship between the cylinder intake air quantity Mc(k) as well as the operation speed NE and the stroke N.

Cylinder fuel supply quantity calculation means A12 obtains a control-use cylinder fuel supply quantity Fc(k−N) at the time point N strokes before the present point in time, through operation of dividing the cylinder intake air quantity Mc(k−N) at the time point N strokes before the present point in time obtained by the cylinder intake-air quantity delay means A11, by the composite air-fuel ratio abyfs this time obtained by the table conversion means A10.

The reason why the control-use cylinder fuel supply quantity Fc(k−N) at the time point N strokes before the present point in time is obtained through division of the cylinder intake air quantity Mc(k−N) at the time point N strokes before the present point in time by the composite air-fuel ratio abyfs at the present point in time is that it takes the dead time L corresponding to N strokes for exhaust gas based on the combustion in the combustion chamber 25 to reach the upstream air-fuel-ratio sensor 66 from the instruction for injecting the fuel.

As described above, the RAM 73 stores target cylinder fuel supply quantities Fcr which the base fuel injection quantity calculation means A3 has obtained for each of intake strokes. Target cylinder fuel supply quantity delay means A13 reads from the RAM 73 a target cylinder fuel supply quantity Fcr (k−N) at the time point N strokes before the present point in time, among the target cylinder fuel supply quantities Fcr.

Cylinder fuel supply quantity deviation calculation means A14 obtains a cylinder fuel supply quantity deviation DFc in accordance with Equation (5) described below; i.e., by subtracting the control-use cylinder fuel supply quantity Fc(k−N) at the time point N strokes before the present point in time obtained by the cylinder fuel supply quantity calculation means A12 from the target cylinder fuel supply quantity Fcr(k−N) at the time point N strokes before the present point in time set by the target cylinder fuel supply quantity delay means A13. The cylinder fuel supply quantity deviation DFc is a quantity that represents the excessiveness/insufficiency of fuel having been supplied to the cylinder at the time point N strokes before the present point in time.

$$DFc = Fcr(k-N) - Fc(k-N) \quad \text{Eq. (5)}$$

A PI controller A15 obtains an upstream-side feedback correction value DFi for compensating the excessiveness/insufficiency of fuel supply amount at the time point N strokes before the present point in time in accordance with Equation (6) described below, i.e., by performing proportional plus integral processing (PI processing) for the cylinder fuel supply quantity deviation DFc, which is calculated by the cylinder fuel supply quantity deviation calculation means A14.

$$DFi = (Gp \cdot DFc + Gi \cdot SDFc) \cdot KFB \quad \text{Eq. (6)}$$

In Equation (6), Gp is a preset proportional gain (proportional constant), and Gi is a preset integral gain (integral constant). SDFc is a value obtained through integration of the cylinder fuel supply quantity deviation DFc with respect to time. The coefficient KFB is preferably changed depending on the operation speed NE, cylinder intake air quantity Mc, and other factors; however, in the present embodiment, the coefficient KFB is set to "1." The upstream-side feedback correction value DFi is used for obtaining the fuel injection quantity Fi by the fuel injection quantity calculation means A5 as previously described.

Since the PI controller A15 contains the integral term Gi·SDFc, the cylinder fuel supply quantity deviation DFc is assured of becoming zero under a steady state. In other words, the steady-state deviation of the control-use cylinder fuel supply quantity Fc(k−N) at the time point N strokes before the present point in time from the target cylinder fuel supply quantity Fcr(k−N) at the time point N strokes before the present point in time becomes zero (the steady-state deviation of the composite air-fuel ratio abyfs from the upstream-side target air-fuel ratio abyfr becomes zero). This means that, under a steady state, the composite air-fuel ratio abyfs is assured of coinciding with the upstream-side target air-fuel ratio abyfr, and hence, the air-fuel ratio on the upstream and downstream sides of the first catalyst unit 53 is assured of coinciding with the upstream-side target air-fuel ratio abyfr. Further, since the proportional term Gp·DFc becomes zero because the cylinder fuel supply quantity deviation DFc becomes zero under a steady state, the upstream-side feedback correction value DFi becomes equal to the integral term Gi·SDFc. The value of this integral term Gi·SDFc becomes a value corresponding to the error of the above-mentioned base fuel injection quantity Fbase. Thus, the error of the base fuel injection quantity Fbase can be compensated.

As described above, the present apparatus feeds back the air-fuel ratio on the basis of the output value Vabyfs from the upstream air-fuel-ratio sensor 66 in such a manner that the target cylinder fuel supply quantity Fcr(k−N) at the time point N strokes before the present point in time coincides with the control-use cylinder fuel supply quantity Fc(k−N) at the time point N strokes before the present point in time. In other words, the air-fuel ratio is fed back such that the composite air-fuel ratio abyfs at the present point coincides with the upstream-side target air-fuel ratio abyfr (at the time point N strokes before the present point in time).

Since the composite air-fuel ratio abyfs is different from the air-fuel ratio obtained from the output value Vabyfs from the upstream air-fuel-ratio sensor 66 by the low-pass filter passed downstream-side feedback correction value Vafsfblow(k−N) (i.e., downstream-side feedback correction value Vafsfb(k)), the composite air-fuel ratio abyfs is also changed in accordance with the output deviation DVoxs of the output value Voxs from the downstream air-fuel-ratio sensor 67 from the downstream-side target value Voxsref. As a result, the present apparatus performs a feedback control of the air-fuel ratio in such a manner that the output value Voxs from the downstream air-fuel-ratio sensor 67 also coincides with the downstream-side target value Voxsref.

The cylinder intake-air quantity delay means A11, cylinder fuel supply quantity calculation means A12, target cylinder fuel supply quantity delay means A13, cylinder fuel supply quantity deviation calculation means A14, and PI controller A15 correspond to upstream-side feedback correction value calculation means. The above is an outline of the feedback control of air-fuel ratio of the engine performed by the air-fuel-ratio control apparatus configured in the above-described manner.

<Suppression of Increase in Fluctuation of Air-fuel Ratio>

Subsequently, coefficient calculation means A16, downstream-side feedback correction value delay means A17, and low-pass filter A18 will be explained in detail. The present apparatus includes the coefficient calculation means A16, downstream-side feedback correction value delay means A17, and low-pass filter A18, whereby it can be prevented that the fluctuation of the upstream-side feedback correction value DFi is gradually increased due to the repeat of the above-mentioned "transmission loop of fluctuation" even if the downstream-side feedback correction value Vafsfb(k) is fluctuated, and consequently, the increase in the fluctuation of the air-fuel ratio can be suppressed.

Figure 6:
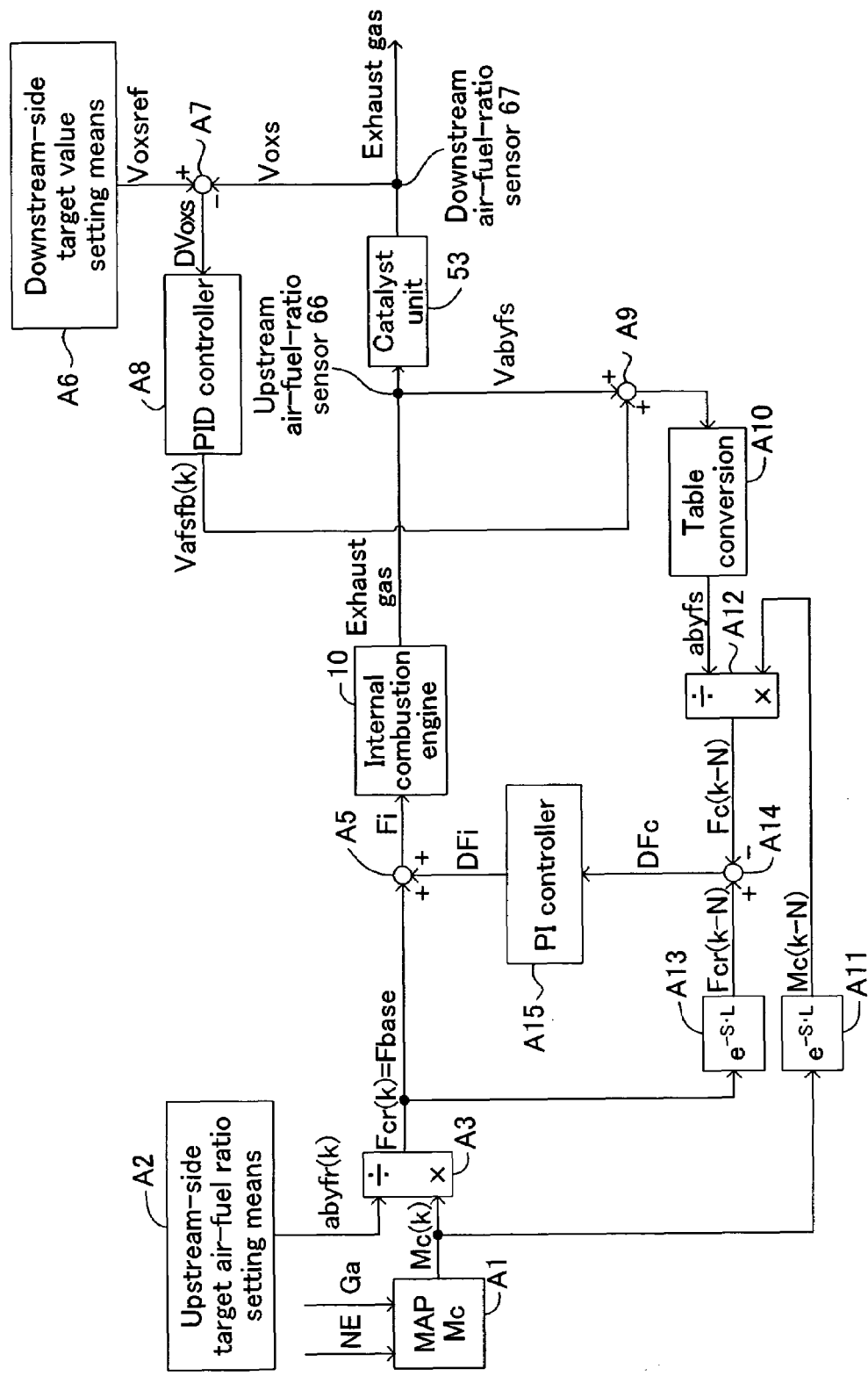
FIG. 6 is a functional block diagram when a conventional apparatus executes an air-fuel-ratio feedback control.

In order to explain the operation and effect, an apparatus (hereinafter referred to as "conventional apparatus") shown in the functional block diagram of FIG. 6 is firstly considered. The conventional apparatus is different from the present apparatus shown in the functional block diagram of FIG. 4 in that the conventional apparatus does not include the coefficient calculation means A16 (and control-use base fuel injection quantity calculation means A4), downstream-side feedback correction value delay means A17, and low-pass filter A18. Specifically, the conventional apparatus calculates the fuel injection quantity Fi by adding the upstream-side feedback correction value DFi to the base fuel injection quantity Fbase itself, and calculates the output value corresponding to the composite air-fuel ratio (Vabyfs+Vafsfb(k)) by adding the downstream-side feedback correction value Vafsfb(k) itself to the output value Vabyfs from the upstream air-fuel-ratio sensor 66.

Figure 7:
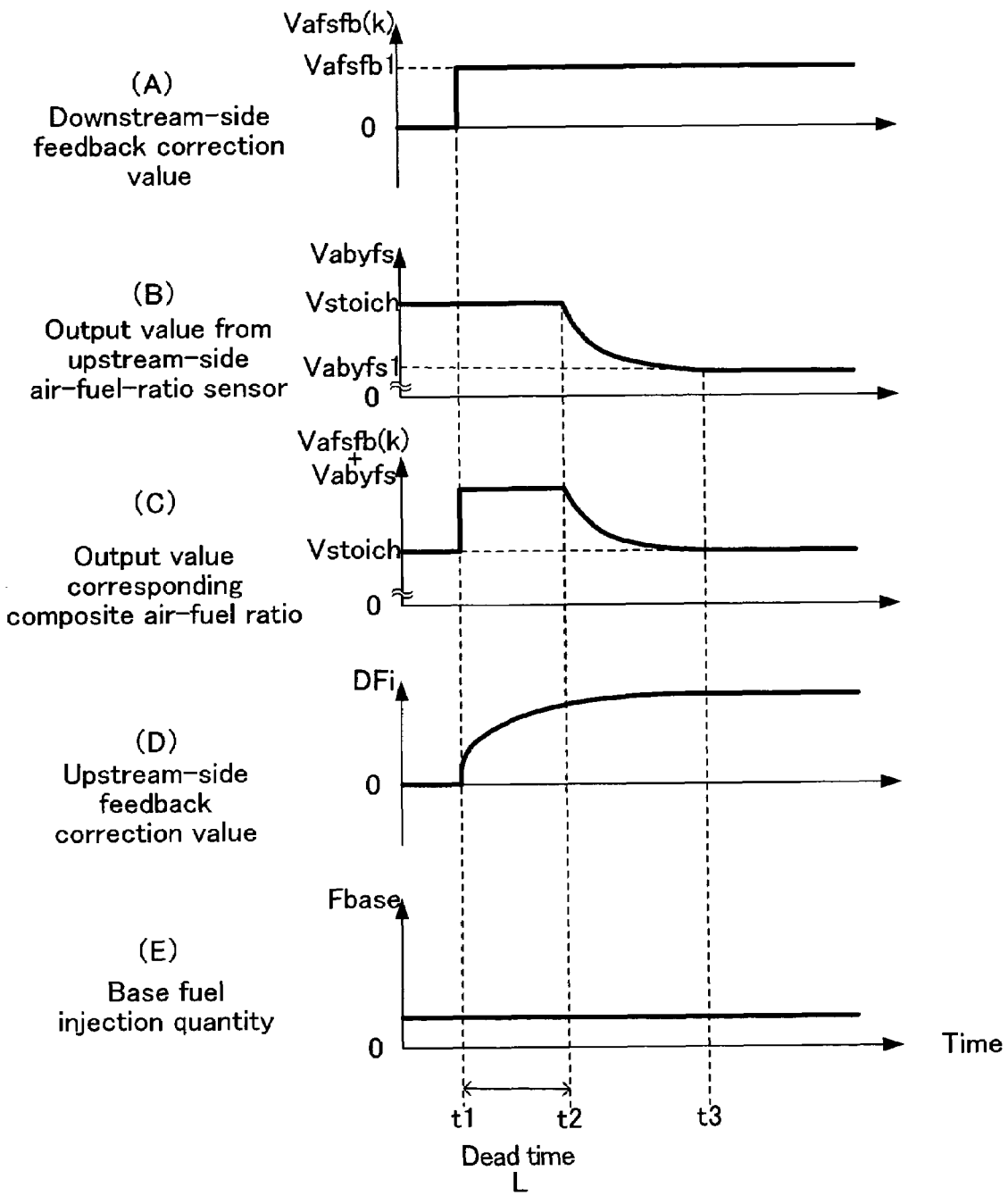
FIG. 7 is a time chart showing one example of a change in various variations etc. when the conventional apparatus executes the air-fuel-ratio feedback control.

FIG. 7 is a time chart showing one example of a change in various variables or the like when the conventional apparatus is applied to the internal combustion engine 10. For simplifying the explanation, this example describes the change in various variations or the like when the downstream-side feedback correction value Vafsfb(k) is supposed to change only once in a stepwise manner in case where the cylinder intake-air quantity Mc(k) and the operation speed NE are constant (i.e., the base fuel injection quantity Fbase is constant as shown in (E)).

In this example, before the time t1 that the downstream-side feedback correction value Vafsfb(k) changes, the downstream-side feedback correction value Vafsfb(k) is maintained to be "0" as shown in (A), the output value Vabyfs from the upstream air-fuel-ratio sensor 66 is maintained to be the upstream-side target value Vstoich (see FIG. 2) that corresponds to the stoichiometric air-fuel ratio as shown in (B), the output value corresponding to composite air-fuel ratio (Vabyfs+Vafsfb(k)) is maintained to be the upstream-side target value Vstoich as shown in (C), and the upstream-side feedback correction value DFi is maintained to be "0" as shown in (D). Specifically, the air-fuel ratio of the exhaust gas is maintained to be the stoichiometric air-fuel ratio before the time t1.

When the downstream-side feedback correction value Vafsfb(k) changes to a positive value Vafsfb1 in a stepwise manner as shown in (A) at the time t1, the output value corresponding to composite air-fuel ratio (Vabyfs+Vafsfb(k)) changes to a value greater than the upstream-side target value Vstoich by the value Vafsfb1 as shown in (C). Accordingly, since the cylinder fuel supply quantity deviation DFc obtained by the cylinder fuel supply quantity deviation calculation means A14 changes to a positive value, the upstream-side feedback correction value DFi changes to a positive value as shown in (D). As a result, after the time t1, the air-fuel ratio of the exhaust gas newly generated is changed to an air-fuel ratio on the rich side by the quantity corresponding to the upstream-side feedback correction value DFi, compared to the stoichiometric air-fuel ratio.

On the other hand, the change of the air-fuel ratio of the exhaust gas on the rich side after the time t1 appears as the change of the output value Vabyfs from the upstream air-fuel-ratio sensor 66 after a time t2 that is a point when the dead time L has elapsed from the time t1. Therefore, as shown in (B), the output value Vabyfs from the upstream air-fuel-ratio sensor 66 is maintained to be the upstream-side target value Vstoich until the time t2, and after the time t2, it decreases toward the value Vabyfs1 (=Vstoich−Vafsfb1) with the response delay of the upstream air-fuel-ratio sensor 66 to be converged to the value Vabyfs1 at a time t3.

With this, as shown in (C), the output value corresponding to composite air-fuel ratio (Vabyfs+Vafsfb(k)) is maintained to be the value greater than the upstream-side target value Vstoich by the value Vafsfb1 from the time t1 to the time t2, decreases toward the upstream-side target value Vstoich with the response delay of the upstream air-fuel-ratio sensor 66 after the time t2, and converges to the upstream-side target value Vstoich at the time t3.

As described above, the output value corresponding to composite air-fuel ratio (Vabyfs+Vafsfb(k)) is maintained to be the value greater than the upstream-side target value Vstoich during the period from the time t1 to the time t3. Accordingly, the cylinder fuel supply quantity deviation DFc is maintained to be a positive value during the period from the time t1 to the time t3, and maintained to be "0" after the time t3. Consequently, the time-integrated value SDFc of the cylinder fuel supply quantity deviation DFc gradually increases from "0" during the period from the time t1 to the time t3, and after the time t3, is maintained to be the value (positive value) at the time t3.

Accordingly, the upstream-side feedback correction value DFi calculated according to Equation (6) gradually increases from "0" during the period from the time t1 to the time t3, and at the time t3, it converges to the positive value that is greatly different from "0" which is the value at the time t1. Notably, this value is equal to the integral term Gi·SDFc in the aforesaid Equation (6).

As described above, when the downstream-side feedback correction value Vafsfb(k) changes in a stepwise manner, the upstream-side feedback correction value DFi converges to a value that is greatly different from the value at the point before the downstream-side feedback correction value Vafsfb(k) changes. This means that, when fluctuation occurs on the downstream-side feedback correction value Vafsfb(k), the fluctuation on the upstream-side feedback correction value DFi gradually increases due to the repeat of the aforesaid "transmission loop of fluctuation", and hence, the fluctuation of the air-fuel ratio increases.

<Operation and Effect of Coefficient Calculation Means A16>

Subsequently considered is an apparatus (hereinafter referred to as "first apparatus"), shown in a functional block diagram of FIG. 6. The first apparatus is formed by adding the coefficient calculation means A16 (and control-use base fuel injection quantity calculation means A4) to the conventional apparatus (i.e., formed by omitting the downstream-side feedback correction value delay means A17 and low-pass filter A18 from the present apparatus shown in the functional block diagram of FIG. 4).

The coefficient calculation means A16 obtains a control-use base fuel injection quantity calculation coefficient Ksub by multiplying a predetermined coefficient K by the value, which is obtained through the division of the downstream-side feedback correction value Vafsfb(k) obtained by the PID controller A8 by the upstream-side target air-fuel ratio abyfr(k) obtained by the upstream-side target air-fuel ratio setting means A2, and adding "1" to the obtained value. The coefficient K is a unit conversion coefficient for making the value (Vafsfb(k)/abyfr(k)) dimensionless.

$$Ksub=(Vafsfb(k)/abyfr(k))\cdot K+1 \qquad \text{Eq. (7)}$$

Here, the downstream-side correction value Vafsfb(k) is the value varying on the basis of "0" as described before. Therefore, as easily understood from Equation (7), the control-use base fuel injection quantity calculation coefficient Ksub becomes a value varying on the basis of "1" according to the downstream-side feedback correction value Vafsfb(k).

The control-use base fuel injection quantity calculation coefficient Ksub is multiplied to the base fuel injection quantity Fbase by the control-use base fuel injection quantity calculation means A4 as described above, with the result that the control-use base fuel injection quantity Fbasec used for the calculation of the fuel injection quantity Fi according to Equation (2) is calculated (see Equation (1)).

Figure 8:
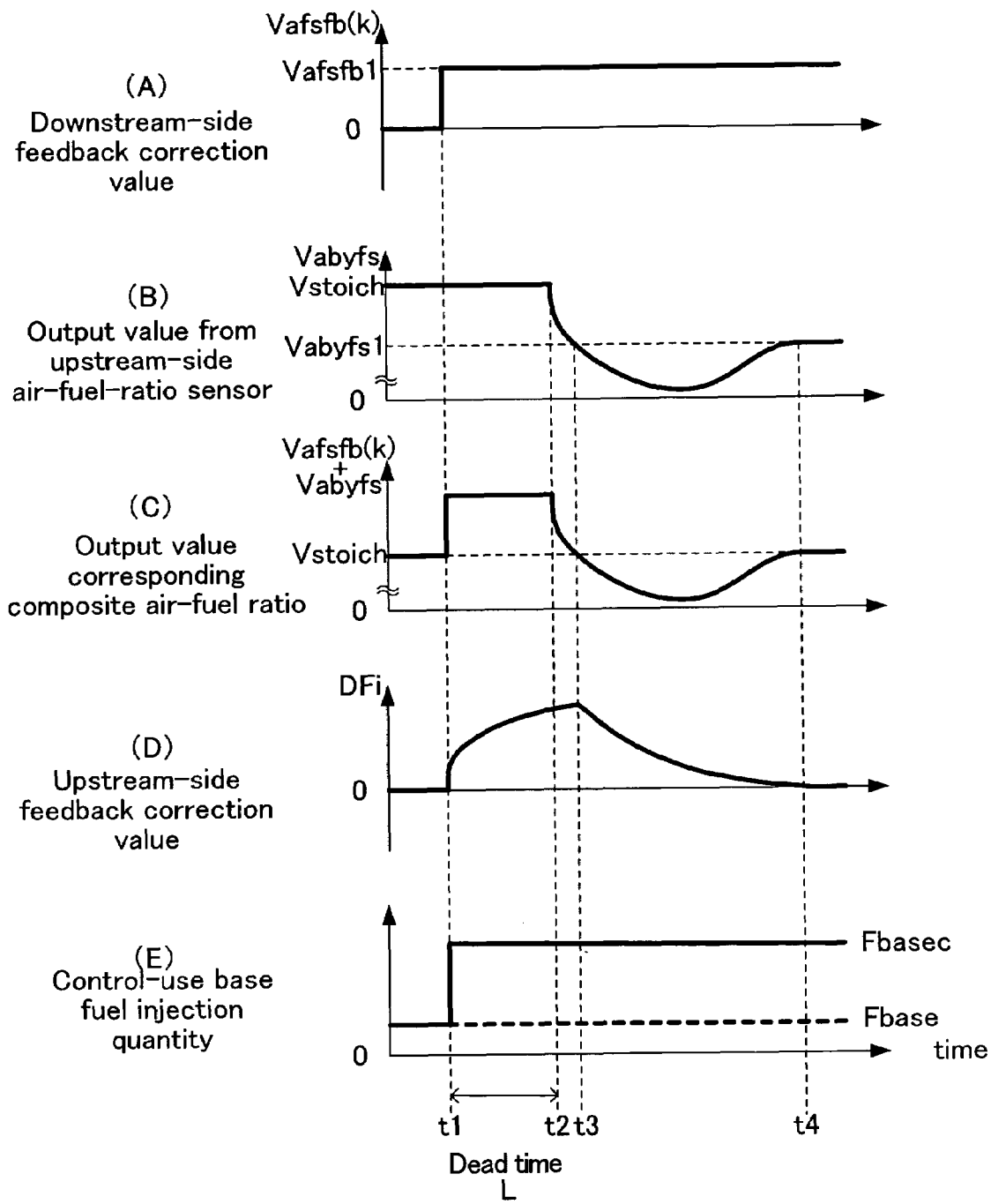
FIG. 8 is a time chart showing one example of a change in various variations etc. when a first apparatus executes the air-fuel-ratio feedback control.

FIG. 8 is a time chart, corresponding to FIG. 7, showing one example of a change in various variations or the like when the first apparatus is applied to the internal combustion engine 10. Times t1, t2 and t3 in FIG. 8 respectively correspond to the times t1, t2 and t3 in FIG. 7 (the same is true for later-described FIGS. 9 and 10). In this case, like the case shown in FIG. 7, when the downstream-side feedback correction value Vafsfb(k) changes from "0" to the value Vafsfb1 in a stepwise manner as shown in (A), the control-use base fuel injection quantity calculation coefficient Ksub changes from "1" to a value greater than "1" in a stepwise manner, so that the control-use base fuel injection quantity Fbasec changes from the base fuel injection quantity Fbase to a value greater than the base fuel injection quantity Fbase in a stepwise manner as shown in (E) (see Equations (1) and (7)).

As a result, after the time t1, the air-fuel ratio of the newly-generated exhaust gas changes to the rich-side air-fuel ratio, compared to the stoichiometric air-fuel ratio, by the value corresponding to the value (Fbasec −Fbase) in addition to the value corresponding to the upstream-side correction value DFi that is changed to the positive value at the time t1, as shown in (D). In other words, the air-fuel ratio of the newly-generated exhaust gas changes to the air-fuel ratio on the richer side than the newly-generated air-fuel ratio after the time t1 in FIG. 7 by the value corresponding to the value (Fbasec−Fbase).

On the other hand, like the case shown in FIG. 7(B), the output value Vabyfs from the upstream air-fuel-ratio sensor 66 is maintained to be the upstream-side target value Vstoich until the time t2 as shown in (B), so that, as shown in (C) and (D), the output value corresponding to composite air-fuel ratio (Vabyfs+Vafsfb(k)) and the upstream-side feedback correction value DFi change by the same manner as in the cases shown in (C) and (D) in FIG. 7 during the period from the time t1 to the time t2.

Since the aforesaid exhaust gas having "the air-fuel ratio on richer side" reaches the upstream air-fuel-ratio sensor 66 after the time t2, the output value Vabyfs from the upstream air-fuel-ratio sensor 66 decreases, as shown in (B), from the upstream-side target value Vstoich more sharply than the case shown in FIG. 7(B), reaches the value Vabyfs1 at the time t3, and still decreases from the value Vabyfs1 after the time t3.

Accordingly, the output value corresponding to composite air-fuel ratio (Vabyfs+Vafsfb(k)) is maintained to be the value greater than the upstream-side target value Vstoich during the period from the time t2 to the time t3, while, the value (Vabyfs+Vafsfb(k)) becomes a value smaller than the upstream-side target value Vstoich after the time t3, as shown in (C). As a result, the upstream-side feedback correction value DFi increases from the time t2 to the time t3, while, the value (Vabyfs+Vafsfb(k)) decreases after the time t3, as shown in (D).

When the upstream-side feedback correction value DFi decreases after the time t3 as described above, the air-fuel ratio of the newly-generated exhaust gas changes to the lean side. The change of the air-fuel ratio of the exhaust gas toward the lean side appears as the change in the output value Vabyfs from the upstream air-fuel-ratio sensor 66 with the delay of the dead time L. As a result, as shown in (B), the output value Vabyfs from the air-fuel-ratio sensor 66 that decreases after the time t3 then rises to converge to the value Vabyfs1 at a time t4.

Specifically, as shown in (C), the output value corresponding to composite air-fuel ratio (Vabyfs+Vafsfb(k)) is maintained to be a value smaller than the upstream-side target value Vstoich from the time t3 to the time t4, and converges to the upstream-side target value Vstoich at the time t4. As a result, as shown in (D), the upstream-side feedback correction value DFi keeps on decreasing from the time t3 to the time t4, and at the time t4, converges to "0", which is the value at the time t1.

As described above, when the downstream-side feedback correction value Vafsfb(k) changes in a stepwise manner, the control-use base fuel injection quantity calculation coefficient Ksub (accordingly, the control-use base fuel injection quantity Fbasec) changes in a stepwise manner such that the output value Vabyfs from the upstream air-fuel-ratio sensor 66 changes in the direction of canceling the change in the downstream-side feedback correction value Vafsfb(k). Accordingly, the upstream-side feedback correction value DFi can converge to the value at the point before the change of the downstream-side feedback correction value Vafsfb(k).

This means that the prevention of the fluctuation in the upstream-side feedback correction value DFi being gradually great due to the repeat of the aforesaid "transmission loop of fluctuation" is possible by the operation of the coefficient calculation means A16, when the fluctuation appears in the downstream-side feedback correction value Vafsfb(k), and hence, the prevention of the increase in the fluctuation in the air-fuel ratio is possible.

In this embodiment, when the downstream-side feedback correction value Vafsfb(k) deviates from "0", the control-use base fuel injection quantity calculation coefficient Ksub is calculated in such a manner that the control-use base fuel injection quantity Fbasec coincides with the quantity of fuel for obtaining the air-fuel ratio corresponding to the output value Vabyfs from the upstream air-fuel-ratio sensor 66 that is deviated from the upstream-side target value Vstoich in the direction of canceling the deviation by the amount equal to the deviation. In other words, the coefficient K is set in Equation (7) for establishing the relationship described above.

<Operation and Effect of Downstream-side Feedback Correction Value Delay Means A17>

As shown in FIG. 8(D), the change in the upstream-side feedback correction value DFi during the period from the time t1 to the time t4 is relatively great in the first apparatus. In order to effectively prevent the increase in the fluctuation of the upstream-side feedback correction value DFi, it is preferable that the change of the upstream-side feedback correction value DFi is more reduced.

The fact that the change of the upstream-side feedback correction value DFi is relatively great in the first apparatus is caused by the upstream-side feedback correction value DFi keeping on rising during the period from the time t1 to the time t2 because of the output value corresponding to composite air-fuel ratio (Vabyfs+Vafsfb(k)) being maintained to be the value greater than the upstream-side target value Vstoich during the period from the time t1 to the time t2.

The output value corresponding to composite air-fuel ratio (Vabyfs+Vafsfb(k)) being maintained to be the value greater than the upstream-side target value Vstoich during the period from the time t1 to the time t2 is based upon the calculation of the output value corresponding to composite air-fuel ratio (Vabyfs+Vafsfb(k)) in such a manner that the downstream-side feedback correction value Vafsfb(k) itself is added to the output value Vabyfs from the upstream air-fuel-ratio sensor 66 that changes in the direction of canceling the change of the downstream-side feedback correction value Vafsfb(k) with the delay of the dead time L.

Specifically, in order to maintain the output value corresponding to composite air-fuel ratio to be the upstream-side target value Vstoich from the time t1 to the time t2 to prevent the rise in the upstream-side feedback correction value DFi, the downstream-side feedback correction value Vafsfb(k−N)

at the time point the dead time L before the present point in time may be used as the value added to the output value Vabyfs from the upstream air-fuel-ratio sensor 66 upon the calculation of the output value corresponding to composite air-fuel ratio, instead of the downstream-side feedback correction value Vafsfb(k) itself.

In view of this, an apparatus (hereinafter referred to as "second apparatus") is considered, this apparatus being obtained by adding the downstream-side feedback correction value delay means A17 to the first apparatus (i.e., the low-pass filter A18 is omitted from the present apparatus shown in the functional block diagram of FIG. 4).

The downstream-side feedback correction value delay means A17 reads from the RAM 73 the downstream-side feedback correction value Vafsfb(k−N) at the time point N strokes (N intake strokes), corresponding to the dead time L, before the present point in time, among the downstream-side feedback correction values Vafsfb obtained for each of intake strokes by the PID controller A8 and stored in the RAM 73.

Accordingly, in the second apparatus, the downstream-side feedback correction value Vafsfb(k−N) at the time point N strokes before the present point in time is added to the output value Vabyfs from the upstream air-fuel-ratio sensor 66, whereby the output value corresponding to composite air-fuel ratio (Vabyfs+Vafsfb(k−N)) is calculated by the output value corresponding to composite air-fuel ratio calculation means A9.

Figure 9:
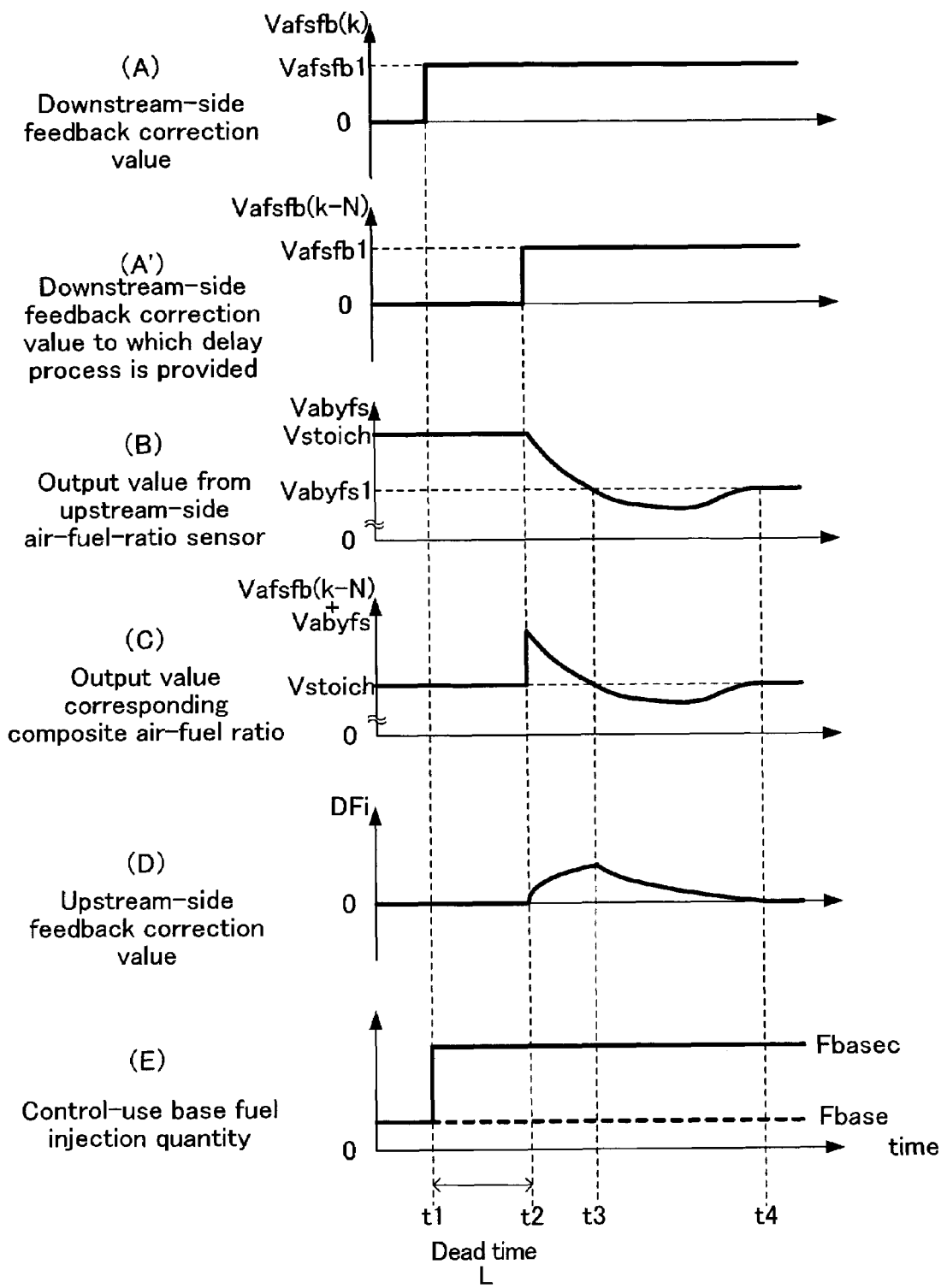
FIG. 9 is a time chart showing one example of a change in various variations etc. when a second apparatus executes the air-fuel-ratio feedback control.

FIG. 9 is a time chart, corresponding to FIG. 8, showing one example of a change in various variations and the like when the second apparatus is applied to the internal combustion engine 10. Like the case shown in FIG. 8, when the downstream-side feedback correction value Vafsfb(k) changes from "0" to the value Vafsfb1 in a stepwise manner at the time t1 as shown in (A), the downstream-side feedback correction value Vafsfb(k−N) at the time point N strokes before the present point in time is maintained to be "0" from the time t1 to the time t2, and changes from "0" to the value Vafsfb1 in a stepwise manner at the time t2, as shown in (A'). Accordingly, the timing of the change in the downstream-side feedback correction value Vafsfb(k−N) at the time point N strokes before the present point in time and the timing of the change in the output value Vabyfs from the upstream air-fuel-ratio sensor 66 coincide with each other at the time t2.

Therefore, the output value corresponding to composite air-fuel ratio (Vabyfs+Vafsfb(k−N)) is maintained to be the upstream-side target value Vstoich from the time t1 to the time t2 as shown in (C). At the time t2, the downstream-side feedback correction value Vafsfb(k−N) at the time point N strokes before the present point in time changes in a stepwise manner, while the output value Vabyfs from the upstream air-fuel-ratio sensor 66 starts to decrease with the response delay of the upstream air-fuel-ratio sensor 66. Accordingly, the output value corresponding to composite air-fuel ratio (Vabyfs+Vafsfb(k−N)) increases to a value greater than the upstream-side target value Vstoich in a stepwise manner at the time t2, decreases after the time t2, and passes the upstream-side target value Vstoich while decreasing at the time t3. In other words, the output value corresponding to composite air-fuel ratio (Vabyfs+Vafsfb(k−N)) becomes greater than the upstream-side target value Vstoich only during the period from the time t2 to the time t3.

With this, the upstream-side feedback correction value DFi is maintained to be "0" from the time t1 to the time t2, and increases only during the period from the time t2 to the time t3, as shown in (D). As a result, compared to the first apparatus in which the upstream-side feedback correction value DFi increases over the period from the time t1 to the time t3, the period when the upstream-side feedback correction value DFi increases becomes short, whereby the change in the upstream-side feedback correction value DFi is much smaller than that in the first apparatus. Specifically, the second apparatus can more effectively prevent the increase in the fluctuation of the upstream-side feedback correction value DFi (accordingly, the increase in the fluctuation of the air-fuel ratio) thanks to the operation of the downstream-side feedback correction value delay means A17.

<Operation and Effect of Low-pass Filter A18>

As shown in (C) and (D) in FIG. 9, the change in the upstream-side feedback correction value DFi during the period from the time t2 to the time t3 is still relatively great in the second apparatus, since the output value corresponding to composite air-fuel ratio (Vabyfs+Vafsfb(k−N)) increases in a stepwise manner at the time t2. This is based upon the output value Vabyfs from the upstream air-fuel-ratio sensor 66 starting to decrease with the response delay of the upstream air-fuel-ratio sensor 66, with respect to the downstream-side feedback correction value Vafsfb(k−N) increasing in a stepwise manner.

Specifically, in order to further reduce the change in the upstream-side feedback correction value DFi during the period from the time t2 to the time t3, the value described below may be used as the value added to the output value Vabyfs from the upstream air-fuel-ratio sensor 66 upon the calculation of the output value corresponding to composite air-fuel ratio. Specifically, the used value (hereinafter referred to as "low-pass filter passed downstream-side feedback correction value Vafsfblow(k−N)") is a value obtained by providing a low-pass filter process having a time constant τ, which is equal to the time constant corresponding to the response delay of the upstream air-fuel-ratio sensor 66, to the downstream-side feedback correction value Vafsfb(k−N) at the time point N strokes before the present point in time. Therefore, an apparatus (i.e., the present apparatus) formed by adding the low-pass filter A18 to the second apparatus is then considered.

The low-pass filter A18 is a first-order filter as expressed by the following Equation (8), which represents the characteristics of the filter by use of a Laplace operator s. In Equation (8), τ is a time constant (a parameter relating to responsiveness). The low-pass filter A18 substantially prohibits passage of high-frequency components whose frequencies are higher than the frequency (1/τ). The low-pass filter A18 receives the downstream-side feedback correction value Vafsfb(k−N) at the time point N strokes before the present point in time obtained by the downstream-side feedback correction value delay means A17, and outputs a low-pass filter passed downstream-side feedback correction value Vafsfblow(k−N) in accordance with Equation (8).

$$1/(1+\tau \cdot s) \qquad \text{Eq. (8)}$$

The degree of the response delay of the upstream air-fuel-ratio sensor 66 tends to decrease with the increase in the cylinder intake air quantity Mc(k) and to decrease with the rise in the operation speed NE. Therefore, the time constant τ can be obtained on the basis of the cylinder intake air quantity Mc(k), and operation speed NE, and with reference to the table Mapτ(Mc(k), NE) shown in FIG. 10, which defines the relationship between the cylinder intake air quantity Mc(k), operation speed NE, and the time constant τ. Accordingly, the degree of the delay in the change of the low-pass filter passed downstream-side feedback correction value Vafsfblow(k−N) can be made close to the degree of the response delay of the upstream air-fuel-ratio sensor 66.

Therefore, in the present apparatus, the low-pass filter passed downstream-side feedback correction value Vafsfblow(k−N) is added to the output value Vabyfs from the upstream air-fuel-ratio sensor 66, whereby the output value corresponding to composite air-fuel ratio (Vabyfs+Vafsfblow(k−N)) is calculated by the output value corresponding to composite air-fuel ratio calculation means A9 as described above.

Figure 11:
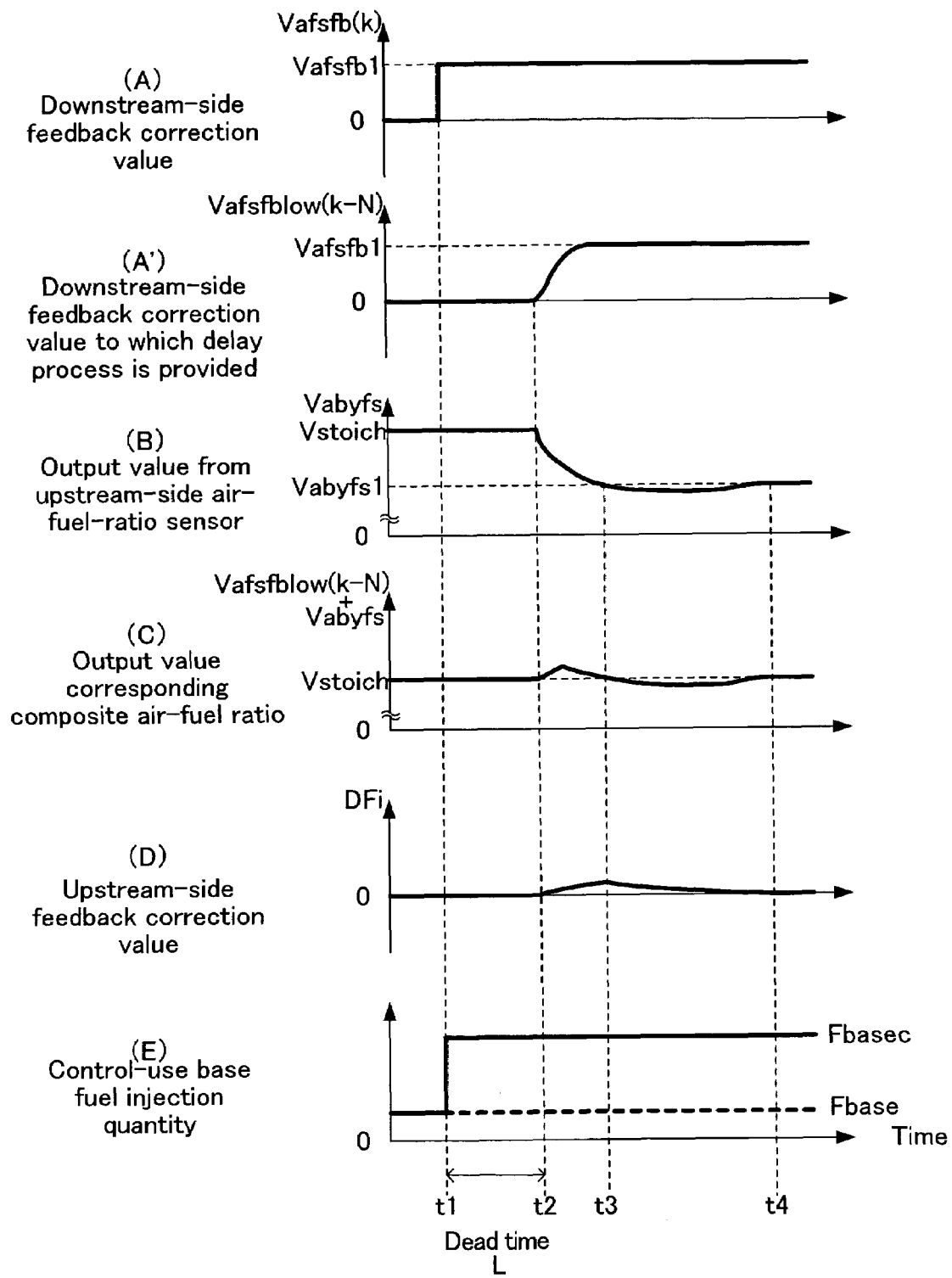
FIG. 11 is a time chart showing one example of a change in various variations etc. when the air-fuel-ratio control apparatus shown in FIG. 1 executes the air-fuel-ratio feedback control.

FIG. 11 is a time chart, corresponding to FIG. 9, showing one example of a change in various variations and the like when the present apparatus is applied to the internal combustion engine 10. Like the case shown in FIG. 9, when the downstream-side feedback correction value Vafsfb(k) changes from "0" to the value Vafsfb1 in a stepwise manner at the time t1 as shown in (A), the low-pass filter passed downstream-side feedback correction value Vafsfblow(k−N) changes from "0" toward the value Vafsfb1 after the time t2 with the response delay in accordance with the time constant τ as shown in (A').

Accordingly, the timing of the change in the low-pass filter passed downstream-side feedback correction value Vafsfblow(k−N) and the timing of the change in the output value Vabyfs from the upstream air-fuel-ratio sensor 66 coincide with each other, and the degree of the delay of the change in the low-pass filter passed downstream-side feedback correction value Vafsfblow(k−N) is made close to the degree of the response delay of the change in the output value Vabyfs from the upstream air-fuel-ratio sensor 66.

Therefore, the output value corresponding to composite air-fuel ratio (Vabyfs+Vafsfblow(k−N)) never greatly increases in a stepwise manner at the time t2, but slightly increases from the upstream-side target value Vstoich during the period from the time t2 to the time t3 as shown in (C). The increasing quantity corresponds to the error between the time constant τ and the aforesaid time constant corresponding to the response delay of the upstream air-fuel-ratio sensor 66.

As a result, the change in the upstream-side feedback correction value DFi during the period from the time t2 to the time t3 becomes much smaller that that in the second apparatus as shown in (D). Specifically, the present apparatus can more effectively prevent the increase in the fluctuation of the upstream-side feedback correction value DFi (accordingly, the increase in the fluctuation of the air-fuel ratio) thanks to the operation of the low-pass filter A18.

Actual Operation:

Next, the actual operation of the air-fuel-ratio control apparatus will be described. For the convenience of explanation, "MapX(a1, a2, ... )" represents a table for obtaining X having arguments a1, a2, .... When the argument is the detected value of the sensors, the current value is used.

<Air-Fuel-Ratio Feedback Control>

Figure 12:
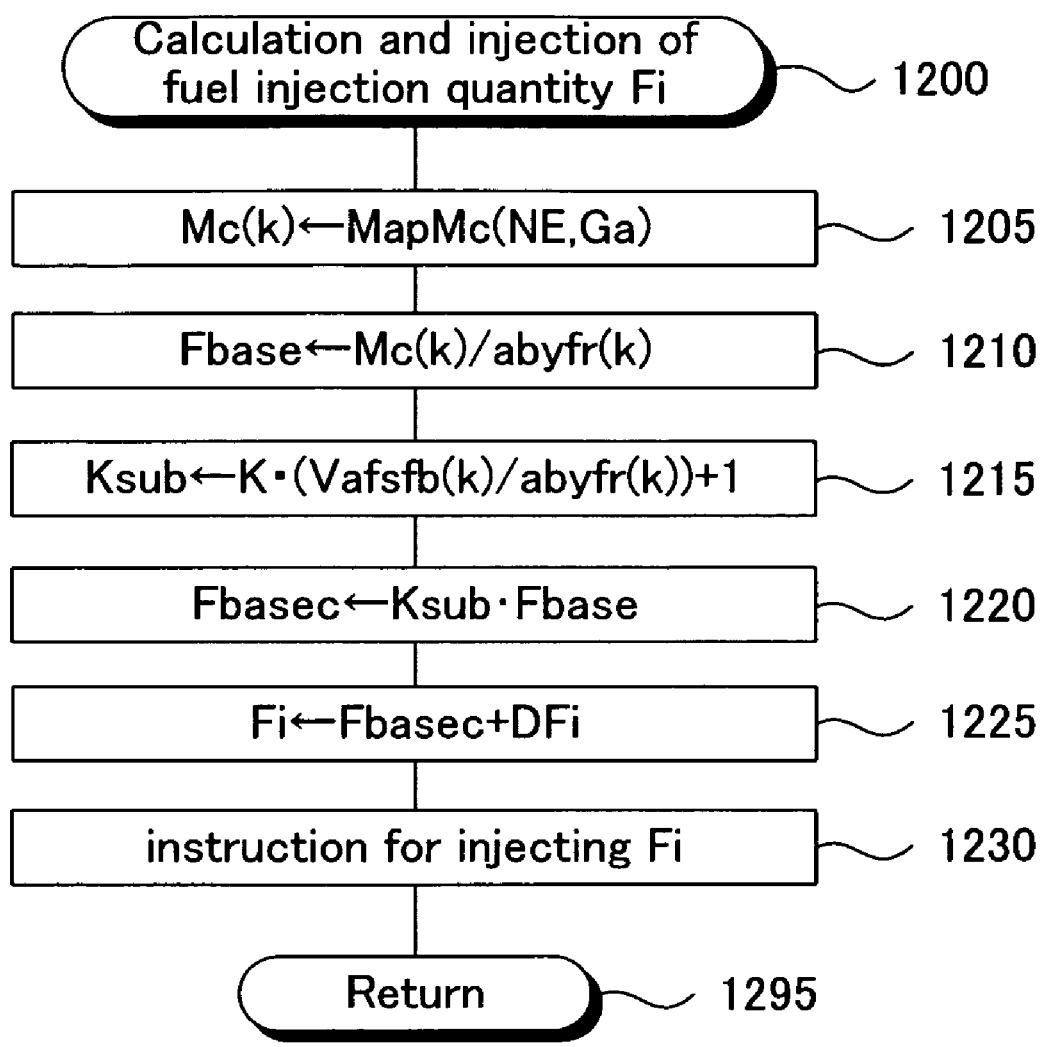
FIG. 12 is a flowchart showing a routine that the CPU shown in FIG. 1 executes so as to calculate a fuel injection quantity and give an instruction of injection.

The CPU 71 repeatedly executes the routine shown by a flowchart in FIG. 12 and adapted to calculate the fuel injection quantity Fi and instruct fuel injection, every time the crank angle of each cylinder reaches a predetermined crank angle before the intake top dead center (e.g., BTDC 90° CA). Accordingly, when the crank angle of an arbitrary cylinder reaches the predetermined crank angle, the CPU 71 starts the processing from step 1200, and proceeds to step 1205, in which the CPU 71 estimates and determines the cylinder intake air quantity Mc(k) this time taken in the cylinder that starts the intake stroke this time (hereinafter sometime referred to as "fuel injection cylinder") on the basis of the table MapMc(NE, Ga).

Subsequently, the CPU 71 proceeds to step 1210 to determine the base fuel injection quantity Fbase by dividing the cylinder intake air quantity Mc(k) by the target air-fuel ratio abyfr(k) this time. Then, the CPU 71 proceeds to step 1215 to obtain the control-use base fuel injection quantity calculation coefficient Ksub in accordance with the equation, corresponding to the Equation (7), described in step 1215. Here, the latest value obtained by the later-described routine (upon the previous fuel injection) is used as the downstream-side feedback correction value Vafsfb(k).

Next, the CPU 71 proceeds to step 1220 to determine the control-use base fuel injection quantity Fbasec by multiplying the base fuel injection quantity Fbase by the control-use base fuel injection quantity calculation coefficient Ksub in accordance with Equation (1). Then, the CPU 71 proceeds to step 1225 to determine the fuel injection quantity Fi by adding the latest upstream-side feedback correction value DFi, which is obtained in the later-described routine (upon the previous fuel injection), to the control-use base fuel injection quantity Fbasec in accordance with Equation (2).

Then, the CPU 71 proceeds to step 1230 to give the instruction for the injection of fuel having the fuel injection quantity Fi, and then, the CPU 71 proceeds to step 1295 so as to temporarily end the present routine. From the above, the control-use base fuel injection quantity Fbasec is calculated on the basis of the downstream-side feedback correction value Vafsfb(k), and the instruction for injecting the fuel in an amount of the fuel injection quantity Fi, which is obtained by providing the feedback correction to the control-use base fuel injection quantity Fbasec, is given to the fuel injection cylinder.

<Calculation of Upstream-side Feedback Correction Value>

Figure 13:
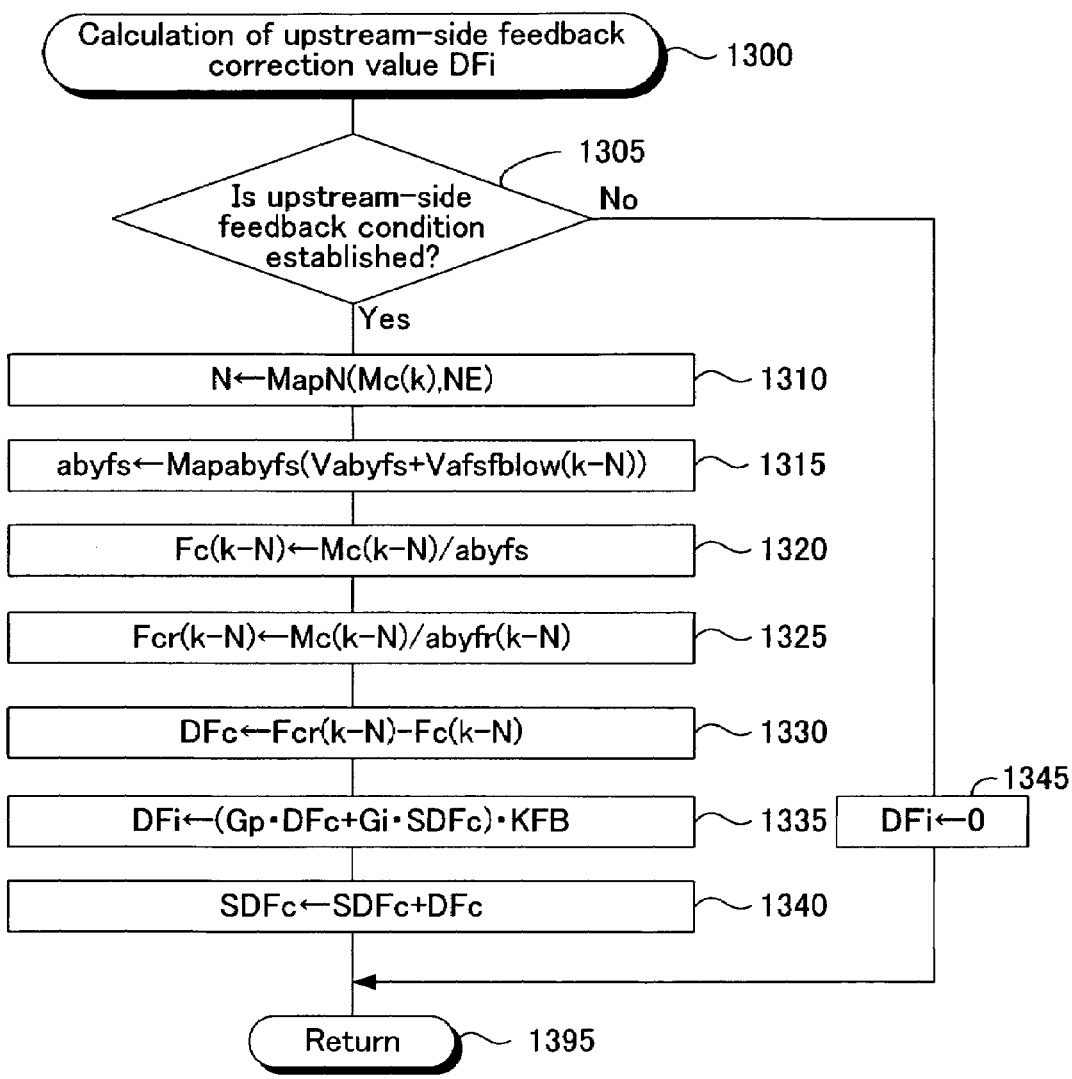
FIG. 13 is a flowchart showing a routine that the CPU shown in FIG. 1 executes so as to calculate an upstream-side feedback correction value.

Subsequently, the operation for calculating the upstream-side feedback correction value DFi will be explained. The CPU 71 repeatedly executes the routine shown by a flowchart in FIG. 13, every time the fuel injection starting time (fuel injection starting point) has come for the fuel injection cylinder. Accordingly, when the fuel injection starting time has come for the fuel injection cylinder, the CPU 71 starts the processing from step 1300, and proceeds to step 1305, in which the CPU 71 determines whether the upstream-side feedback condition is established or not. Here, the upstream-side feedback condition is established, for example, when the temperature THW of the cooling water for the engine is not less than a first prescribed temperature, the upstream air-fuel-ratio sensor 66 is normal (including the activated state), and the intake air quantity (load) per one rotation of the engine is not more than a prescribed value.

The description will be continued under the assumption that the upstream-side feedback condition is satisfied presently. The CPU 71 makes "Yes" determination at step 1305, and proceeds to step 1310 so as to determine the stroke N on the basis of the table MapN(Mc(k), NE) (see FIG. 5). Then, the CPU 71 proceeds to step 1315 so as to obtain the composite air-fuel ratio abyfs at the present by converting the output value corresponding to composite air-fuel ratio (Vabyfs+Vafsfblow(k−N)), which is the sum of the output value Vabyfs from the upstream air-fuel-ratio sensor 66 at the present and the low-pass filter passed downstream-side feedback correction value Vafsfblow(k−N) at the time point N strokes before the present point in time obtained through the routine described later, on the basis of the table Mapabyfs (Vabyfs+Vafsfblow(k−N)) (see FIG. 2).

Subsequently, the CPU 71 proceeds to step 1320 so as to obtain the actual cylinder fuel supply quantity Fc(k−N) at the time point N strokes before the present point in time through the division of the cylinder intake air quantity Mc(k−N), which is air quantity of the cylinder that has started an intake stroke at N strokes (N intake strokes) before the present point in time, by the above-mentioned composite air-fuel ratio abyfs.

Then, the CPU 71 proceeds to step 1325 so as to obtain the target cylinder fuel supply quantity Fcr(k−N) at N strokes before the present point in time through the division of the cylinder intake air quantity Mc(k−N) at N strokes before the present point in time by the target air-fuel ratio abyfr(k−N) at N stroke before the present point in time.

Next, the CPU 71 proceeds to step 1330 so as to obtain the cylinder fuel supply quantity deviation DFc by subtracting the cylinder fuel supply quantity Fc(k−N) from the target cylinder fuel supply quantity Fcr(k−N) in accordance with the Equation (5). Specifically, the cylinder fuel supply quantity deviation DFc is a quantity that represents the excessiveness/insufficiency of fuel having been supplied to the cylinder at the time point N strokes before the present point in time.

Then, the CPU 71 proceeds to step 1335 so as to obtain the upstream-side feedback correction value DFi in accordance with the equation, corresponding to the Equation (6), described in step 1335. At the successive step 1340, the CPU 71 obtains new integral value SDFc of the cylinder fuel supply quantity deviation by adding the cylinder fuel supply quantity deviation DFc obtained at the step 1330 to the integral value SDFc of the cylinder fuel supply quantity deviation DFc at the present time, and then, proceeds to step 1395 to end the present routine for the present.

In this manner, the upstream-side feedback correction value DFi is obtained, and since the upstream-side feedback correction value DFi is reflected on the fuel injection quantity Fi by the step 1225 in FIG. 12, the air-fuel-ratio feedback control is executed.

On the other hand, when the upstream-side feedback condition is not established at the determination at step 1305, the CPU 71 makes "No" determination at step 1305, and proceeds to step 1345 so as to set the upstream-side feedback correction value DFi to "0", and then, proceeds to step 1395 to end the present routine for the present. When the upstream-side feedback condition is not satisfied, the upstream-side feedback correction value DFi is set to "0", and the correction for the air-fuel ratio is not performed as described above.

<Calculation of Downstream-side Feedback Correction Value>

Figure 14:
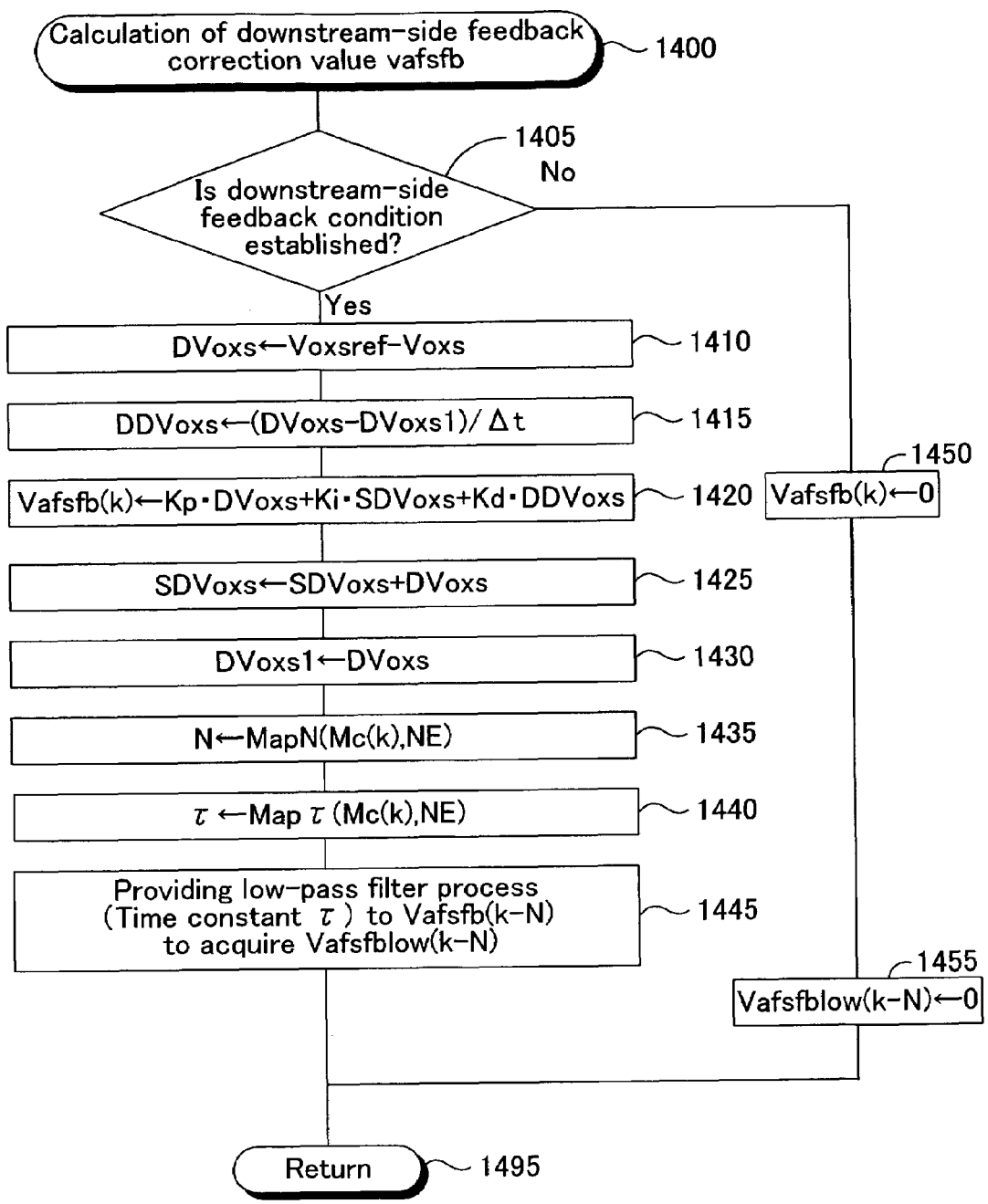
FIG. 14 is a flowchart showing a routine that the CPU shown in FIG. 1 executes so as to calculate a downstream-side feedback correction value.

Subsequently, the operation for calculating the downstream-side feedback correction value Vafsfb(k) will be explained. The CPU 71 repeatedly executes the routine shown by a flowchart in FIG. 14, every time the fuel injection starting time (fuel injection starting point) has come for the fuel injection cylinder. Accordingly, when the fuel injection starting time has come for the fuel injection cylinder, the CPU 71 starts the processing from step 1400, and proceeds to step 1405, in which the CPU 71 determines whether the downstream-side feedback condition is established or not. Here, the downstream-side feedback condition is established, for example, when the temperature THW of the cooling water for the engine is not less than a second prescribed temperature, which is higher than the first prescribed temperature, in addition to the aforesaid upstream-side feedback condition at step 1305.

The description will be continued under the assumption that the downstream-side feedback condition is satisfied presently. The CPU 71 makes "Yes" determination at step 1405, and proceeds to step 1410 so as to obtain the output deviation DVoxs by subtracting the output value Voxs from the downstream air-fuel-ratio sensor 67 at the present time from the downstream-side target value Voxsref in accordance with Equation (3). Then, the CPU 71 proceeds to step 1415 so as to obtain the differential value DDVoxs of the output deviation DVoxs on the basis of Equation (9) described below.

$$DDVoxs=(DVoxs-DVoxs1)/\Delta t \qquad \text{Eq. (9)}$$

In Equation (9), DVoxs1 represents the previous value of the output deviation DVoxs, which has been set (updated) in the later-described step 1425 in the previous execution of the present routine. Further, $\Delta t$ represents the period from the point of the previous execution of the present routine to the point of the execution of the present routine this time.

Then, the CPU 71 proceeds to step 1420 so as to obtain the downstream-side feedback correction value Vafsfb(k) this time in accordance with the equation, corresponding to the Equation (4), described in step 1420. This downstream-side feedback correction value Vafsfb(k) is used for obtaining the control-use base fuel injection quantity calculation coefficient Ksub at step 1215 upon the next execution of the routine shown in FIG. 12.

Subsequently, the CPU 71 proceeds to step 1425 so as to obtain new integral value SDVoxs of the output deviation by adding the output deviation DVoxs obtained at step 1410 to the integral value SDVoxs of the output deviation at that point in time, and at the successive step 1430, the CPU 71 sets the previous value DVoxs1 of the output deviation DVoxs as the output deviation DVoxs obtained at the step 1410.

Figure 10:
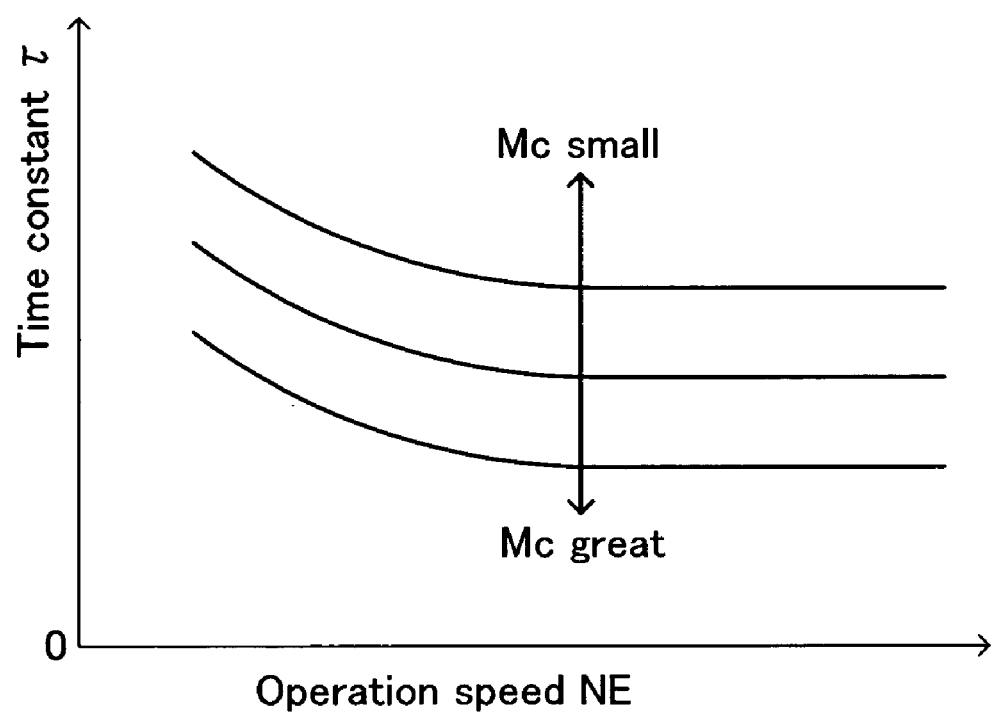
FIG. 10 is a graph referred to by the CPU shown in FIG. 1 and showing a table that defines the relationship between the cylinder intake-air quantity as well as the operation speed and a time constant of a low-pass filter process.

Then, the CPU 71 proceeds to step 1435 so as to determine the stroke N on the basis of the table MapN(Mc(k), NE), and at the successive step 1440, it determines the time constant $\tau$ for the low-pass filter process executed at the successive step 1445 on the basis of the table Map$\tau$(Mc(k), NE) (see FIG. 10).

Next, the CPU 71 proceeds to step 1445 so as to acquire the low-pass filter passed downstream-side feedback correction value Vafsfblow(k−N) by providing the low-pass filter process to the downstream-side feedback correction value Vafsfb(k−N) at N strokes before the present point in time with the time constant $\tau$ by the low-pass filter A18, and then, proceeds to step 1495 so as to end the present routine for the present. The low-pass filter passed downstream-side feedback correction value Vafsfblow(k−N) is used for obtaining the composite air-fuel ratio abyfs at step 1315 upon the next execution of the routine shown in FIG. 13.

On the other hand, when the downstream-side feedback condition is not satisfied upon the determination at step 1405, the CPU 71 makes "No" determination at step 1405, and then, proceeds to step 1450 so as to set the downstream-side feedback correction value Vafsfb(k) to "0". Thereafter, the CPU 71 sets the low-pass filter passed downstream-side feedback correction value Vafsfblow(k−N) at N strokes before the present point in time to "0" at the successive step 1455, and then, proceeds to step 1495 so as to end the present routine for the present.

In this manner, when the downstream-side feedback condition is not satisfied, the downstream-side feedback correction value Vafsfb(k) is set to "0", whereby the control-use base fuel injection quantity calculation coefficient Ksub is set to "1" at the step 1215 in FIG. 12, with the result that the control-use base fuel injection quantity Fbasec is set to the value equal to the base fuel injection quantity Fbase at step 1220. Further, since the low-pass filter passed downstream-side feedback correction value Vafsfblow(k−N) at N strokes before the present point in time is set to "0", the output value corresponding to composite air-fuel ratio becomes equal to the output value Vabyfs from the upstream air-fuel-ratio sensor 66, with the result that the composite air-fuel ratio abyfs becomes equal to the air-fuel ratio detected by the upstream air-fuel-ratio sensor 66 at the step 1310 in FIG. 13.

As explained above, according to the first embodiment of the air-fuel-ratio control apparatus for an internal combustion engine according to the present invention, the composite air-fuel ratio abyfs is obtained from the downstream-side feedback correction value Vafsfb(k) on the basis of the output value Voxs from the downstream air-fuel-ratio sensor 67 at the downstream side of the first catalyst unit 53 and the output value Vabyfs from the upstream air-fuel-ratio sensor 66 at the upstream side of the first catalyst unit 53, and the upstream-side feedback correction value DFi is obtained on the basis of the composite air-fuel ratio abyfs. The fuel injection quantity Fi is determined to a value obtained by adding the upstream-side feedback correction value DFi to the control-use base fuel injection quantity Fbasec (=base fuel injection quantity Fbase·control-use base fuel injection quantity calculation coefficient Ksub).

Here, the control-use base fuel injection quantity calculation coefficient Ksub is determined, on the basis of the downstream-side feedback correction value Vafsfb(k), in such a manner that the control-use base fuel injection quantity Fbasec (accordingly, fuel injection quantity Fi) is determined such that the output value Vabyfs from the upstream air-fuel-ratio sensor 66 changes in the direction of canceling the change of the downstream-side feedback correction value Vafsfb(k) (see Equation (7)). Accordingly, even if the downstream-side feedback correction value Vafsfb(k) changes, the change of the composite air-fuel ratio abyfs (accordingly, the change of the upstream-side feedback correction value DFi) can be suppressed.

Accordingly, even if the aforesaid "transmission loop of fluctuation" is repeated due to the fluctuation in the downstream-side feedback correction value Vafsfb(k), it can be prevented that the fluctuation in the upstream-side feedback correction value DFi on the basis of the composite air-fuel ratio abyfs is increased, whereby the increase in the fluctuation of the air-fuel ratio can be suppressed.

Further, when the composite air-fuel ratio abyfs is obtained, the timing of the change in the low-pass filter passed downstream-side feedback correction value Vafsfblow(k−N), which is the value obtained by providing the delay process by the downstream-side feedback correction value delay means A17 and the low-pass filter A18 to the downstream-side feedback correction value Vafsfb(k), and the timing of the change in the output value Vabyfs from the upstream air-fuel-ratio sensor 66 coincide with each other, and the degree of the delay of the change in the low-pass filter passed downstream-side feedback correction value Vafsfblow(k−N) is made close to the degree of the response delay of the change in the output value Vabyfs from the upstream air-fuel-ratio sensor 66. As a result, the increase in the fluctuation of the upstream-side feedback correction value DFi (accordingly, the increase in the fluctuation of the air-fuel ratio) can more effectively be suppressed.

Second Embodiment

Subsequently, an air-fuel-ratio control apparatus according to the second embodiment of the present invention will be explained. This second embodiment is different from the first embodiment, which is shown in the functional diagram of FIG. 4, in that a P controller A19 is used instead of the PI controller A15, and a base fuel injection quantity correction coefficient setting means A20 and pre-corrected base fuel injection quantity correcting means A21 are further added. The different points are mainly explained below.

The P controller A19 performs a proportional process (P-processing) to the cylinder fuel supply quantity deviation DFc calculated by the cylinder fuel supply quantity deviation calculation means A14, thereby obtaining the upstream-side feedback correction value DFi for compensating the excessiveness/insufficiency of fuel supply amount at the time point N strokes before the present point in time in accordance with Equation (10) described below. In Equation (10), Gp is a preset proportional gain (proportional constant).

$$DFi = Gp \cdot DFc \qquad \text{Eq. (10)}$$

Since the P controller A19 does not include the integral term, different from the PI controller A15 in the first embodiment, the error of the base fuel injection quantity cannot be compensated. Therefore, separate from the correction by the P controller A19 (accordingly, the upstream-side feedback correction), the error of the base fuel injection quantity needs to be compensated. In order to achieve this operation, it is necessary to make a correction in such a manner that the corrected base fuel injection quantity Fbase, which is the value obtained by correcting the base fuel injection quantity Fbase calculated by the base fuel injection quantity calculation means A3, become equal to (is made close to) the amount of the fuel (hereinafter referred to as "target base fuel injection quantity Fbaset") that should be instructed to the injector 39 to inject from the cylinder that has started the intake stroke in order to make the actual air-fuel ratio the target air-fuel ratio abyfr. Below, the base fuel injection quantity calculated by the base fuel injection quantity calculation means A3 is referred to as "pre-corrected base fuel injection quantity Fbaseb(k)".

Figure 15:
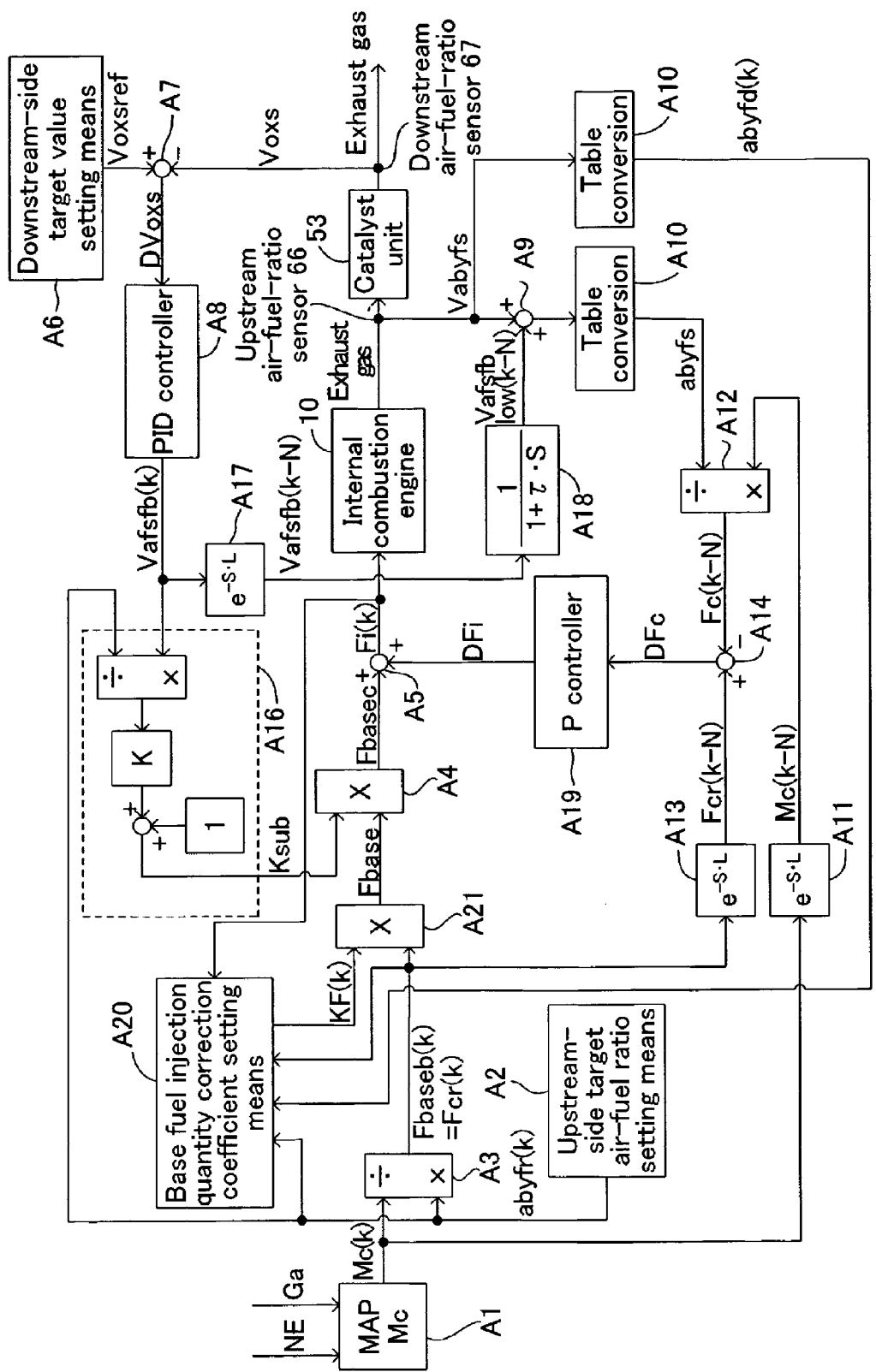
FIG. 15 is a functional block diagram when an air-fuel-ratio control apparatus according to a second embodiment executes an air-fuel-ratio feedback control.

In the second embodiment, as shown in FIG. 15, the base fuel injection quantity correction coefficient KF(k) is introduced, and the base fuel injection quantity correction coefficient KF(k) is set by the base fuel injection quantity correction coefficient setting means A20 in such a manner that the value (hereinafter referred to as "corrected base fuel injection quantity Fbase") obtained by the pre-corrected base fuel injection quantity correcting means A21 multiplying the pre-corrected base fuel injection quantity Fbaseb(k) by the base fuel injection quantity correction coefficient KF(k) becomes equal to (is made close to) the target base fuel injection quantity Fbaset. This corrected base fuel injection quantity Fbase is used for the calculation of the control-use base fuel injection quantity Fbasec by the control-use base fuel injection quantity calculation means A4. The base fuel injection quantity correction coefficient setting means A20 and the corrected base fuel injection quantity calculation means A21 will be explained below.

In general, on the assumption that the cylinder intake air quantity taken in the combustion chamber is constant, the product of the fuel injection quantity and air-fuel ratio (accordingly, air-fuel ratio of exhaust gas) becomes constant. Therefore, under this assumption, the relationship is established such that the product of the fuel injection quantity Fi(k−N), at N strokes before the present point in time, which is a fuel injection quantity relating to the fuel injection instruction executed at the time point N strokes (N intake stroke), corresponding to the dead time L, before the present point in time (specifically, the injection instruction start point of the fuel injection quantity Fi(k) this time), and the air-fuel ratio at the present point obtained from the upstream air-fuel-ratio sensor 66 (hereinafter referred to as "detected air-fuel ratio abyfd(k)") is equal to the product of the target base fuel injection quantity Fbaset, which is required to make the actual air-fuel ratio of the gas mixture supplied to the combustion chamber the target air-fuel ratio abyfr(k) this time, and the target air-fuel ratio abyfr(k) this time. Therefore, the target base fuel injection quantity Fbaset can generally be represented by Equation (11) described below.

$$Fbaset = (abyfd(k)/abyfr(k)) \cdot Fi(k-N) \qquad \text{Eq. (11)}$$

As described above, the detected air-fuel ratio abyfd(k) this time is used as the detected air-fuel ratio abyfd upon the calculation of the target base fuel injection quantity Fbaset, while the fuel injection quantity Fi(k–N) at N strokes before the present point in time is used as the fuel injection quantity Fi. This is because it takes the dead time L, which corresponds to the N stroke, during the period from the fuel injection instruction to the time that the exhaust gas based upon the combustion in the combustion chamber 25 reaches the upstream air-fuel-ratio sensor 66.

According to the knowledge described above, the base fuel injection quantity correction coefficient setting means A20 sets the base fuel injection quantity correction coefficient KF(k) by utilizing the Equation (11). In addition, when the engine is in a transient operation state, the detected air-fuel ratio abyfd, fuel injection quantity Fi, and pre-corrected base fuel injection quantity Fbaseb can greatly vary independently with a high frequency of not less than the prescribed frequency. In this case, the relationship represented by the Equation (11) might not be maintained. Therefore, the low-pass filter process is preferably used in order to realize the stable correction of the base fuel injection quantity.

Figure 16:
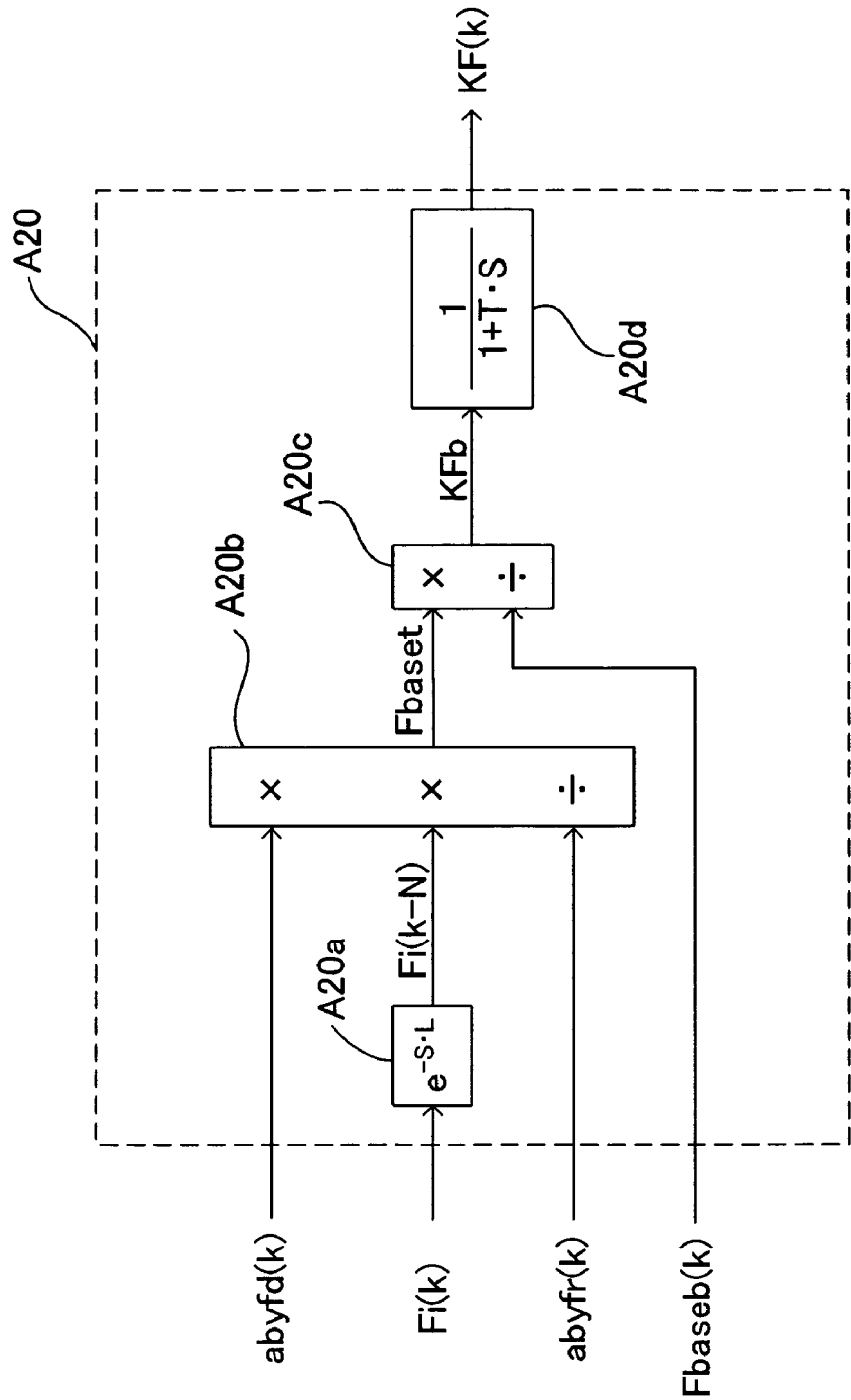
FIG. 16 is a functional block diagram when the base fuel injection quantity correction coefficient setting means shown in FIG. 15 sets a base fuel injection quantity correction coefficient.
Figure 17:
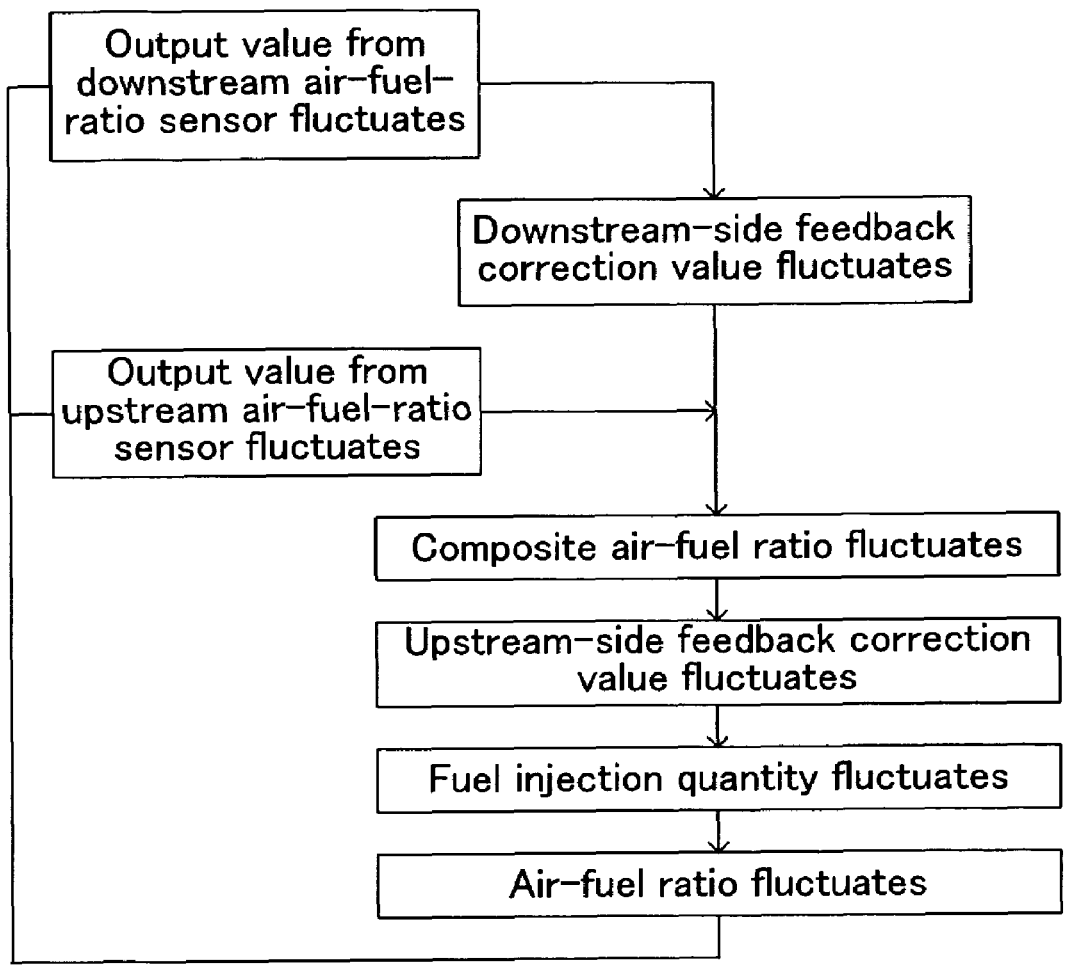
FIG. 17 is a diagram for explaining a transmission loop of fluctuation.

From the above, as shown by the functional block diagram of FIG. 16, the base fuel injection quantity correction coefficient setting means A20 includes various means A20a to A20d. As described above, the RAM 73 stores fuel injection quantities Fi which the fuel injection quantity calculation means A5 has obtained for each of intake strokes. Fuel injection quantity delay means A20a reads from the RAM 73 a fuel injection quantity Fi(k–N) at the time point N strokes before the present point in time.

Target base fuel injection quantity calculation means A20b obtains the target base fuel injection quantity Fbaset by multiplying the value, which is obtained by dividing the detected air-fuel ratio abyfd(k) this time by the target air-fuel ratio abyfr(k) this time, by the fuel injection quantity Fi(k–N) at the time point N strokes before the present point in time read by the fuel injection quantity delay means A20a, in accordance with Equation (11).

Base fuel injection quantity correction coefficient setting means A20c obtains a fuel injection quantity correction coefficient before low-pass filter process KFb by dividing the target base fuel injection quantity Fbaset obtained by the target base fuel injection quantity calculation means A20b by the pre-corrected base fuel injection quantity Fbaseb(k), in accordance with Equation (12).

$$KFb = Fbaset/Fbaseb(k) \qquad \text{Eq. (12)}$$

A low-pass filter A20d is a first-order filter as expressed by the following Equation (13), which represents the characteristics of the filter by use of a Laplace operators. In Equation (13), T is a time constant. The low-pass filter A20d receives the fuel injection quantity correction coefficient before low-pass filter process KFb, provides the low-pass filter process to the fuel injection quantity correction coefficient before low-pass filter process KFb in accordance with Equation (13) to obtain the base fuel injection quantity correction coefficient KF(k), and outputs the same.

$$1/(1+T \cdot s) \qquad \text{Eq. (13)}$$

The pre-corrected base fuel injection quantity correcting means A21 multiplies the pre-corrected base fuel injection quantity Fbaseb(k) obtained by the base fuel injection quantity calculation means A3 by the base fuel injection quantity correction coefficient KF(k) set by the base fuel injection quantity correction coefficient setting means A20, thereby obtaining the corrected base fuel injection quantity Fbase according to the Equation (14) described below. The control-use base fuel injection quantity calculation coefficient Ksub is multiplied by the thus obtained corrected base fuel injection quantity Fbase, whereby the control-use base fuel injection quantity Fbasec is obtained, like the air-fuel-ratio control apparatus according to the first embodiment.

$$Fbase = KF(k) \cdot Fbaseb(k) \qquad \text{Eq. (14)}$$

The above is the method of setting the base fuel injection quantity correction coefficient, and the base fuel injection quantity correction coefficient setting means A20 and the pre-corrected base fuel injection quantity correcting means A21 correspond to base fuel injection quantity correcting means.

As explained above, according to the second embodiment of the air-fuel-ratio control apparatus for an internal combustion engine according to the present invention, the corrected base fuel injection quantity Fbase is determined so as to coincide with (approach) the quantity of the fuel that should be instructed to be injected for making the air-fuel ratio the target air-fuel ratio abyfr. As a result, like the air-fuel-ratio control apparatus according to the first embodiment, the increase in the fluctuation of the air-fuel ratio can be prevented, and the error of the base fuel injection quantity can immediately be compensated without performing the integral processing in the upstream-side feed back control, whereby the temporal increase in the amount of the emission due to the increase in the error of the base fuel injection quantity can be prevented.

The present invention is not limited to the above-described embodiments, and various modifications may be employed without departing from the scope of the invention. For example, in the above-described second embodiment, the low-pass filter A20d obtains the base fuel injection quantity correction coefficient before low-pass filter process KFb (=(abyfd(k)·Fi(k–N)/(abyfr(k)·Fbaseb(k))) from the detected air-fuel ratio abyfd(k), fuel injection quantity Fi(k–N), and pre-corrected base fuel injection quantity Fbaseb(k), and provides the low-pass filter process to the base fuel injection quantity correction coefficient before low-pass filter process KFb, thereby obtaining the base fuel injection quantity correction coefficient KF(k). However, instead of this, the low-pass filter process may be provided independently to each of the detected air-fuel ratio abyfd(k), fuel injection quantity Fi(k–N), and pre-corrected base fuel injection quantity Fbaseb(k), and then, the base fuel injection quantity correction coefficient KF(k) may be obtained by using each value that has been subject to the low-pass filter process.

In the second embodiment, the base fuel injection quantity correction coefficient KF(k) is obtained on the basis of the detected air-fuel ratio abyfd(k) this time, fuel injection quantity Fi(k–N) at the time point N strokes before the present point in time, target air-fuel ratio abyfr(k) this time, and pre-corrected base fuel injection quantity Fbaseb(k) this time, as shown in FIG. 16. However, the base fuel injection quantity correction coefficient KF may be obtained on the basis of the detected air-fuel ratio abyfd(k), fuel injection quantity Fi(k–N) at the time point N strokes before the present point in time, target air-fuel ratio abyfr(k–N) at the time point N strokes before the present point in time, and pre-corrected base fuel injection quantity Fbaseb(k–N) at the time point N strokes before the present point in time.

Although in the second embodiment, the target base fuel injection quantity Fbaset is obtained on the basis of the Equation (11), the target base fuel injection quantity Fbaset may be obtained by utilizing the equation wherein the detected air-fuel ratio abyfd(k) is replaced by the composite air-fuel ratio abyfs in the Equation (11). This configuration is effective for the case where an error is produced in the detected air-fuel ratio abyfd of the upstream air-fuel-ratio sensor 66.

In the above-mentioned each embodiment, the control-use base fuel injection quantity Fbasec is obtained by multiplying the base fuel injection quantity Fbase by the control-use base fuel injection quantity calculation coefficient Ksub. However, instead of this, the control-use base fuel injection quantity Fbasec may be obtained, in accordance with the Equation (15) described below, by adding a control-use base fuel injection quantity calculation constant Dsub to the base fuel injection quantity Fbase. The control-use base fuel injection quantity calculation constant Dsub can be obtained, in accordance with the Equation (16) described below, by multiplying the downstream-side feedback correction value Vafsfb(k) obtained by the PID controller A8 by a prescribed coefficient K1.

$$Fbasec = Fbase + Dsub \quad \text{Eq. (15)}$$

$$Dsub = K1 \cdot Vafsfb(k) \quad \text{Eq. (16)}$$

In this case, when the downstream-side feedback correction value Vafsfb(k) is deviated from "0", it is preferable that the control-use base fuel injection quantity calculation constant Dsub is calculated in such a manner that the control-use base fuel injection quantity Fbasec coincides with the quantity of fuel for obtaining the air-fuel ratio corresponding to the output value Vabyfs from the upstream air-fuel-ratio sensor 66 that is deviated from the upstream-side target value Vstoich in the direction of canceling the deviation by the amount equal to the deviation. In other words, it is preferable that the coefficient K1 in Equation (16) is set so as to establish the relationship described above.

In the above-mentioned each embodiment, the downstream-side feedback correction value delay means A17 and low-pass filter A18 are provided in order to provide the delay process to the downstream-side feedback correction value Vafsfb(k). However, either one of them may be provided, or both of them may not be provided.

In the above-mentioned each embodiment, the upstream-side feedback correction value DFi is obtained upon the upstream-side feedback control on the basis of the cylinder supply quantity deviation DFc, which is the value obtained by subtracting the control-use cylinder fuel supply quantity Fc(k–N) at the time point N strokes before the present point in time from the target cylinder fuel supply quantity Fcr(k–N) at the time point N strokes before the present point in time. However, the upstream-side feedback correction value DFi may be obtained on the basis of the value obtained by subtracting the target air-fuel ratio abyfr(k–N) at the time point N strokes before the present point in time from the composite air-fuel ratio abyfs(k) this time.

The invention claimed is:

1. An air-fuel-ratio control apparatus applied to an internal combustion engine including;
    a catalyst unit disposed in an exhaust passage of the internal combustion engine;
    upstream air-fuel-ratio sensor disposed in the exhaust passage to be located upstream of the catalyst unit;
    downstream air-fuel-ratio sensor disposed in the exhaust passage to be located downstream of the catalyst unit; and
    fuel injecting means for injecting fuel according to an instruction, the air-fuel-ratio control apparatus comprising:
    base fuel injection quantity acquiring means that acquires a base fuel injection quantity, which is a quantity of fuel for obtaining a target air-fuel ratio, on the basis of the operation state of the internal combustion engine;
    downstream-side feedback correction value calculation means that calculates a downstream-side feedback correction value, which is a feedback correction value for feedback-controlling an air-fuel ratio of an gas mixture supplied to the internal combustion engine, on the basis of the output value from the downstream air-fuel-ratio sensor;
    control-use base fuel injection quantity acquiring means that acquires a control-use base fuel injection quantity, which is a fuel-injection quantity for feedback-controlling the air-fuel ratio of the gas mixture supplied to the internal combustion engine, on the basis of the acquired base fuel injection quantity and the calculated downstream-side feedback correction value;
    composite air-fuel ratio acquiring means that acquires a value corresponding to composite air-fuel ratio, which corresponds to an air-fuel ratio for feedback-controlling the air-fuel ratio of the gas mixture supplied to the internal combustion engine, on the basis of the output value from the upstream air-fuel-ratio sensor and the calculated downstream-side feedback correction value;
    upstream-side feedback correction value calculation means that calculates an upstream-side feedback correction value, which is a feedback correction value for feedback-controlling the air-fuel ratio of the gas mixture supplied to the internal combustion engine, on the basis of the acquired value corresponding to composite air-fuel ratio;
    fuel injection quantity calculation means that calculates the fuel injection quantity on the basis of the acquired control-use base fuel injection quantity and the calculated upstream-side feedback correction value; and
    air-fuel-ratio control means that feedback-controls the air-fuel ratio of the gas mixture supplied to the internal combustion engine by giving the instruction for injecting the fuel in the calculated fuel injection quantity to the fuel injecting means.

2. An air-fuel-ratio control apparatus for an internal combustion engine according to claim 1, wherein
    the control-use base fuel injection quantity acquiring means is configured to acquire the control-use base fuel injection quantity by multiplying the acquired based fuel injection quantity by the value, which is obtained by adding 1 to the value through the multiplication of the calculated downstream-side feedback correction value by a prescribed coefficient.

3. An air-fuel-ratio control apparatus for an internal combustion engine according to claim 1, wherein
    the composite air-fuel ratio acquiring means is configured to use the value that is obtained by providing a delay process to the downstream-side feedback correction value upon acquiring the value corresponding to the composite air-fuel ratio.

4. An air-fuel-ratio control apparatus for an internal combustion engine according to claim 3, further comprising
    dead time acquiring means that acquires a dead time, which is the period from the instruction for injecting the fuel to the time that the exhaust gas according to the combustion of the fuel reaches the upstream air-fuel-ratio sensor, and the composite air-fuel ratio acquiring means is configured to use the downstream-side feedback correction value calculated at the point the dead time before the present point in time as the value obtained by providing the delay process to the downstream-side feedback correction value.

5. An air-fuel-ratio control apparatus for an internal combustion engine according to claim 4, wherein the dead time acquiring means is configured to change the dead time in accordance with the operation state of the internal combustion engine.

6. An air-fuel-ratio control apparatus for an internal combustion engine according to claim 3, further comprising low-pass filter processing means that provides a low-pass filter process to the downstream-side feedback correction value, and the composite air-fuel ratio acquiring means is configured to use the value obtained by providing the low-pass filter process to the downstream-side feedback correction value as the value obtained by providing the delay process to the downstream-side feedback correction value.

7. An air-fuel-ratio control apparatus for an internal combustion engine according to claim 6, wherein the low-pass filter processing means is configured to change a parameter relating to the responsiveness of the low-pass filter process in accordance with the operation state of the internal combustion engine.

8. An air-fuel-ratio control apparatus for an internal combustion engine according to claim 1, wherein the upstream-side feedback correction value calculation means is configured to calculate the upstream-side feedback correction value on the basis of the value obtained by providing at least the integral processing to the difference between the value corresponding to the target air-fuel ratio and the obtained value corresponding to the composite air-fuel ratio.

9. An air-fuel ratio control apparatus for an internal combustion engine according to claim 1, further comprising:

base fuel injection quantity correcting means that corrects the base fuel injection quantity in such a manner that a quantity of the fuel actually injected by the fuel injecting means becomes a quantity necessary for making the actual air-fuel ratio of the gas mixture supplied to the internal combustion engine equal to the target air-fuel ratio, when it is assumed that the instruction for injecting the fuel in the base fuel injection quantity is given to the fuel injecting means.

* * * * *